United States Patent
Yoshida

(10) Patent No.: US 6,507,414 B1
(45) Date of Patent: Jan. 14, 2003

(54) COMMUNICATION SYSTEM AND COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/250,247

(22) Filed: Feb. 16, 1999

(30) Foreign Application Priority Data

Feb. 17, 1998 (JP) .......................................... 10-051555

(51) Int. Cl.[7] .......................... H04N 1/00; H04M 11/00
(52) U.S. Cl. .................... 358/407; 358/402; 379/100.09
(58) Field of Search ................................. 358/402, 407, 358/440, 442; 379/100.09

(56) References Cited

U.S. PATENT DOCUMENTS

| | | | | |
|---|---|---|---|---|
| 5,521,719 A | * | 5/1996 | Yamada ........................ 358/435 |
| 5,742,402 A | * | 4/1998 | Kobayashi et al. ........... 358/404 |
| 5,991,290 A | * | 11/1999 | Malik ........................... 358/440 |
| 6,097,797 A | * | 8/2000 | Oseto ........................... 358/402 |
| 6,396,848 B1 | * | 5/2002 | Ohta ............................ 370/352 |
| 2002/0048051 A1 | * | 4/2002 | Momonami et al. ......... 358/440 |

* cited by examiner

*Primary Examiner*—Kimberly A. Williams
(74) *Attorney, Agent, or Firm*—Fitzpatrick, Cella, Harper & Scinto

(57) ABSTRACT

To effectively executing the relay multi-address calling with sub-address signals in a communication system capable of data communication according to ITU-T Recommendation T.33. When relay multi-address calling destinations are designated with sub-address signals from a calling facsimile apparatus, the facsimile apparatus instructed to execute the relay multi-address calling notifies relay multi-address calling impermissible ones of the designated multi-address calling destinations to the calling facsimile apparatus and executes the relay multi-address calling to relay multi-address calling permissible destinations, then notifying this communication result to the calling facsimile apparatus having instructed on relay multi-address calling. On the other hand, the calling facsimile apparatus having instructed to execute the relay multi-address calling directly calls the relay multi-address calling impermissible destination and sends the original data thereto.

25 Claims, 28 Drawing Sheets

COMMUNICATION SYSTEM AND COMMUNICATION APPARATUS

BACKGROUND OF THE INVENTION

1. Field of the Invention

The present invention relates to communication system and communication apparatus such as a facsimile system capable of performing the sub-address communication according to ITU-T recommendation T.33.

2. Related Background Art

Conventionally, in a facsimile system according to ITU-T Recommendation T.33, for example, it is proposed to execute the relay multi-address calling (or broadcasting) by notifying secondary telephone numbers with sub-address signals. With this ITU-T Recommendation T.33, the same information is relay-broadcasted to call the destinations designated by the calling facsimile apparatus.

In the conventional system, since a facsimile apparatus to which the secondary telephone numbers are notified with the sub-address signals relay-broadcasts regarding all the notified secondary numbers, there occurs such a great problem that even an unintended relay multi-address calling is executed, thereby increasing a communication cost very much.

SUMMARY OF THE INVENTION

Thus, it is an object of the present invention to provide a communication system and a communication apparatus capable of effectively executing a relay multi-address calling with sub-address signals.

DETAILED DESCRIPTION OF THE PREFERRED EMBODIMENTS

Figure 1:
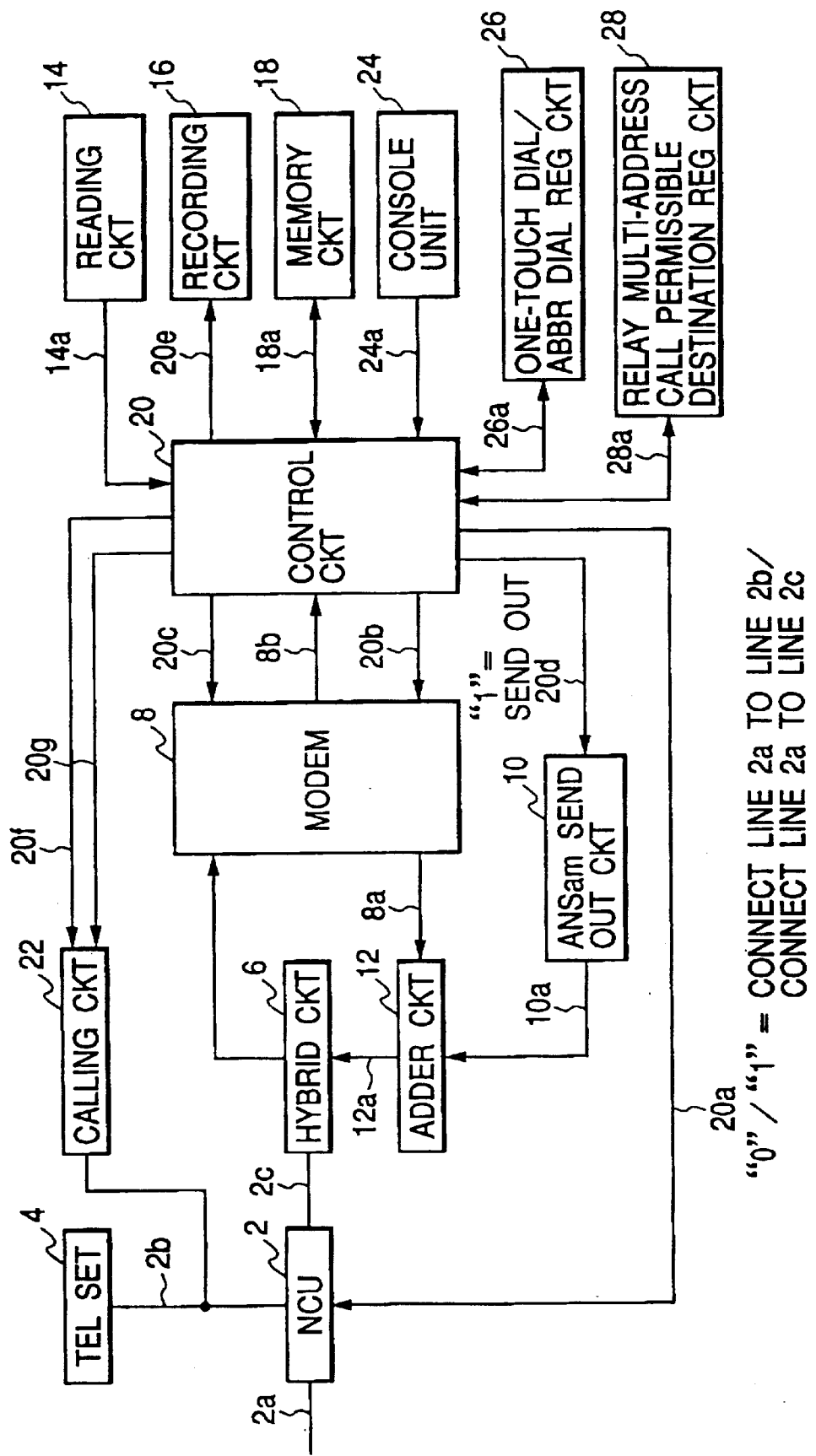
FIG. 1 is a block diagram showing the configuration of a facsimile apparatus used in Embodiments 1 and 2 of the present invention.

FIG. 1 is a block diagram showing the configuration of facsimile apparatuses according to Embodiments 1 and 2 of the present invention.

In use for data communication or the like, an NCU (Network Control Unit) 2 connects a telephone network to a terminal thereof to make a connection control of a telephone exchange network, to make an exchange to a data communication line or to make a hold of a loop. In addition, the NCU 2 connects a telephone line 2a to the side of a telephone set 4 if a signal level (signal line 20a) from a control circuit 20 is 0, and connects the telephone line 2a to the side of the facsimile apparatus if the signal level is 1. Incidentally, in a normal condition, the telephone line 2a is connected to the side of the telephone set 4.

A hybrid circuit 6 separates signals of a sender system and signals of a receiver system, sends out a send signal from an adder circuit 12 to the telephone line 2a via the NCU 2 and receives a signal from a partner side via the NCU 2 to send it to a modem 8 via a signal line 6a.

The modem 8 performs modulation and demodulation according to ITU-T Recommendation V.8, V.21, V.27 ter, V.29, V.17 and V.34, where each individual transmission mode is specified through a signal line 20c. This modem 8 inputs a signal on a signal line 20b to output the modulated data to a signal line 8a and inputs a receive signal on the signal line 6a to output the demodulated data to a signal line 8b.

An ANSam send-out circuit 10 is a circuit for sending out an ANSam signal, which sends out an ANSam signal to a signal line 10a if a signal of signal level 1 is output on a signal line 20d and sends no signal to the signal line 10a if a signal of signal level 0 is output onto the signal line 20d.

An adder circuit 12 inputs data on the signal line 8a and data on the signal line 10a and outputs an addition result to a signal line 12a. A reading circuit 14 reads an original image and outputs read data to a signal line 14a. A recording circuit 16 records data output on a signal line 20e in succession for each line.

A memory circuit 18 is used to store raw information or coded information of readout data and to store received information or demodulated information.

A calling circuit 22, when a calling instruction pulse takes place on a signal line 20g, outputs data about a telephone number output on a signal line 20f to the signal line 2b as a selection signal.

A console unit (operation unit) 24 possesses one-touch dials, short-cut keys, #.* keys, ten keys, a sub-address input key, a set key, a start key, a stop key, a registration key to registering circuits 26 and 28 and other function keys, and outputs data on depressed key to a signal line 24a.

The registering circuit 26 is a circuit for registering one-touch dials and shortcut dials, which registers therein one-touch dials and shortcut dials via a signal line 26a.

The registering circuit 28 is a circuit for registering a relay multi-address calling permissible destination, which registers therein the relay multi-address calling permissible destination via a signal line 28a when relay multi-address calling is instructed by a sub-address signal.

The control circuit 20 controls this whole facsimile apparatus and in Embodiment 1 of the present invention, it controls the facsimile communication according to ITU-U Recommendation T.33.

When a destination for the relay multi-address calling is designated by the sub-address signal from a calling facsimile apparatus, a relay multi-address calling instructed facsimile apparatus is so controlled as to notify relay multi-address calling impermissible one(s) of the designated destinations to the calling facsimile apparatus, while executing the relay multi-address calling to the relay multi-address calling permissible destinations, and notify the communication results to the calling facsimile apparatus which has instructed the relay multi-address calling.

On the other hand, the calling facsimile apparatus which has instructed the relay multi-address calling, directly calls the destination notified as the relay multi-address calling impermissible one and sends the original data. Here, the communication result notified from the facsimile apparatus which has executed the relay multi-address calling and the communication result of the direct calling to the destination notified as the relay multi-address calling impermissible one are combined and processed as one communication result.

FIGS. 2, 3, 4A, 4B, 5, 6 and 7 are flowcharts showing the control flow of the control circuit 20 in Embodiment 1 of the present invention.

Figure 2:
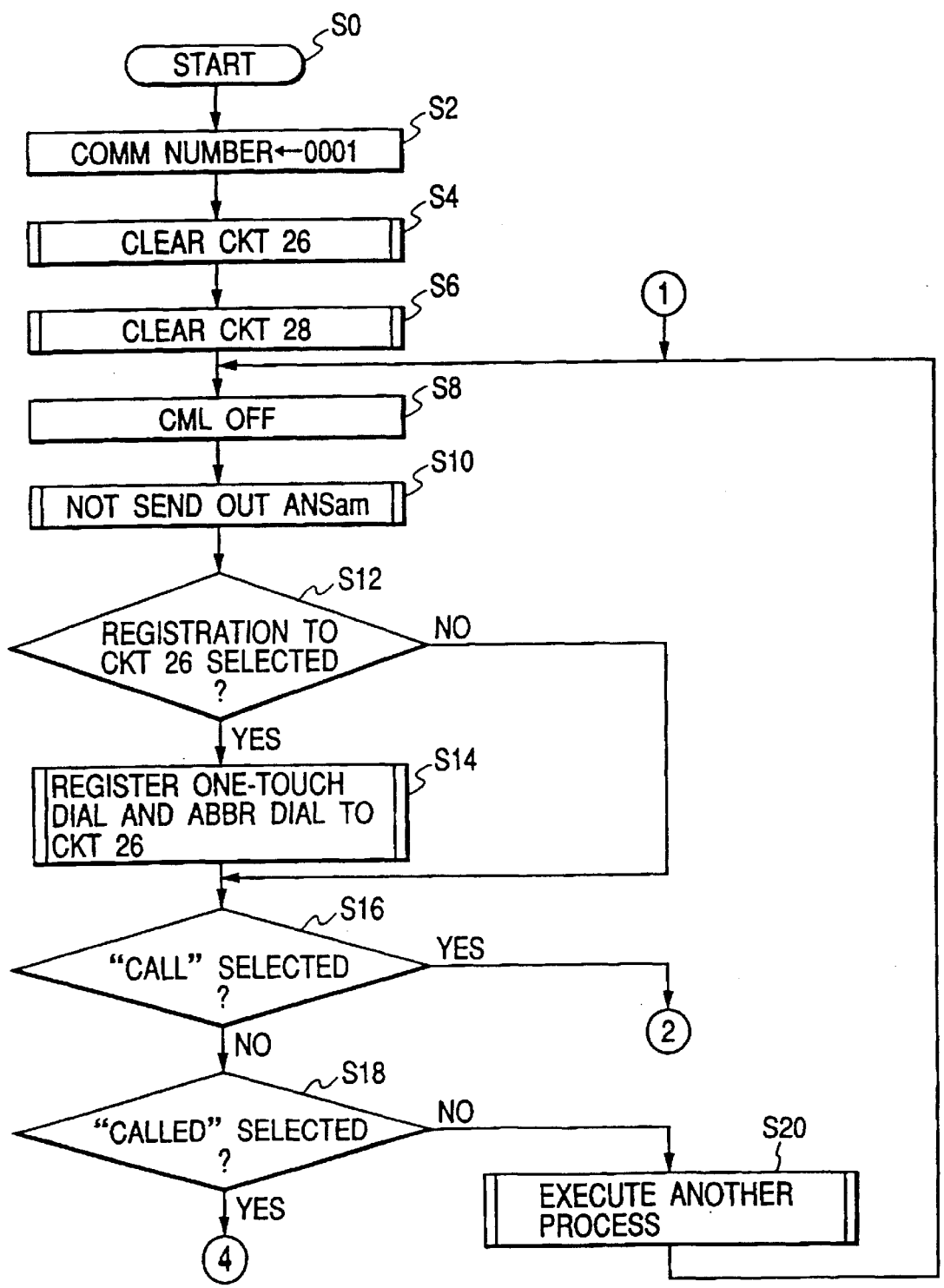
FIG. 2 is a flowchart showing the operation of Embodiment 1.
Figure 3:
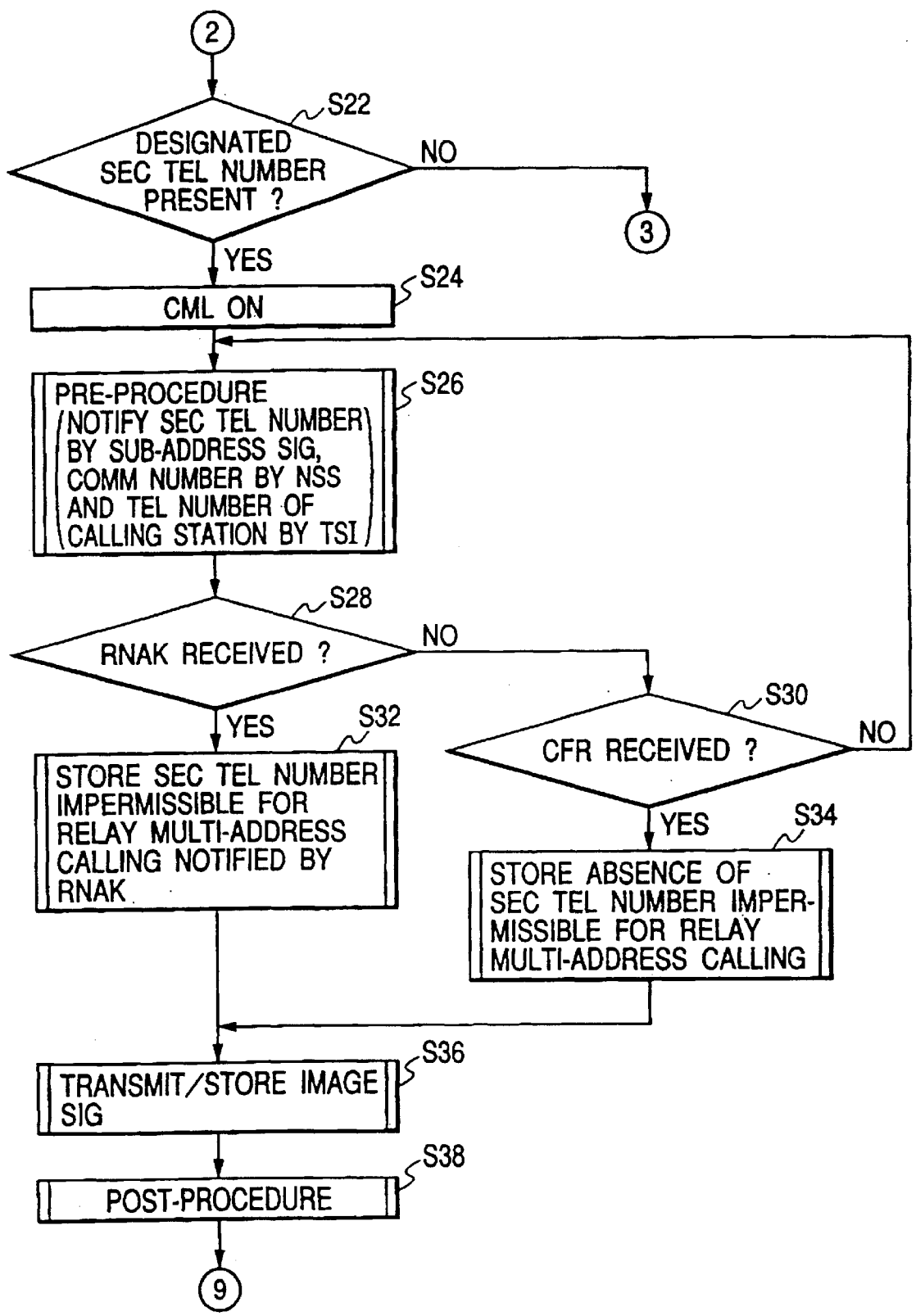
FIG. 3 is a flowchart showing the operation of Embodiment 1.
Figure 4A:
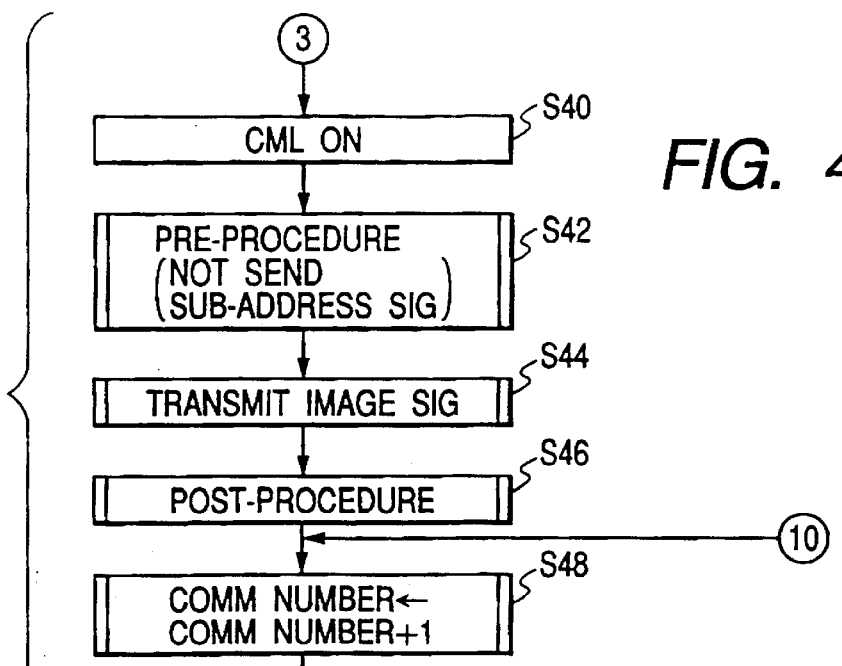
FIGS. 4A and 4B are flowcharts showing the operation of Embodiment 1.
Figure 4B:
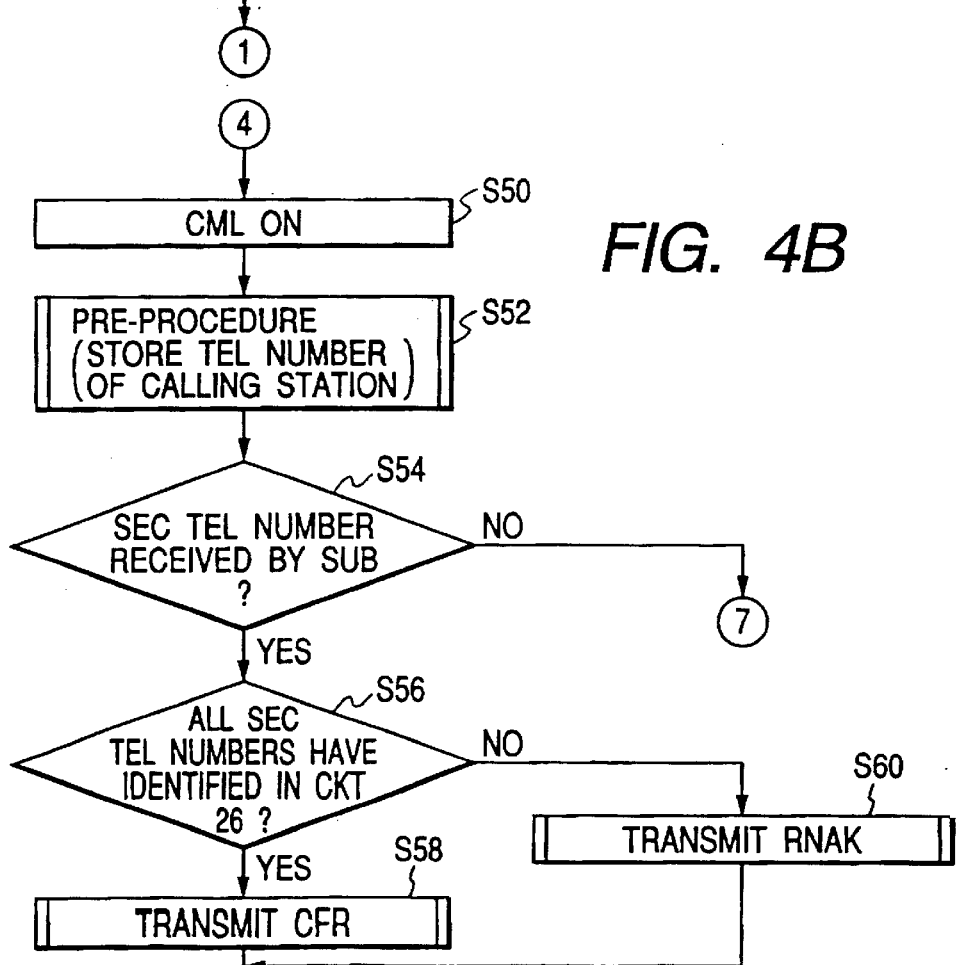
Figure 5:
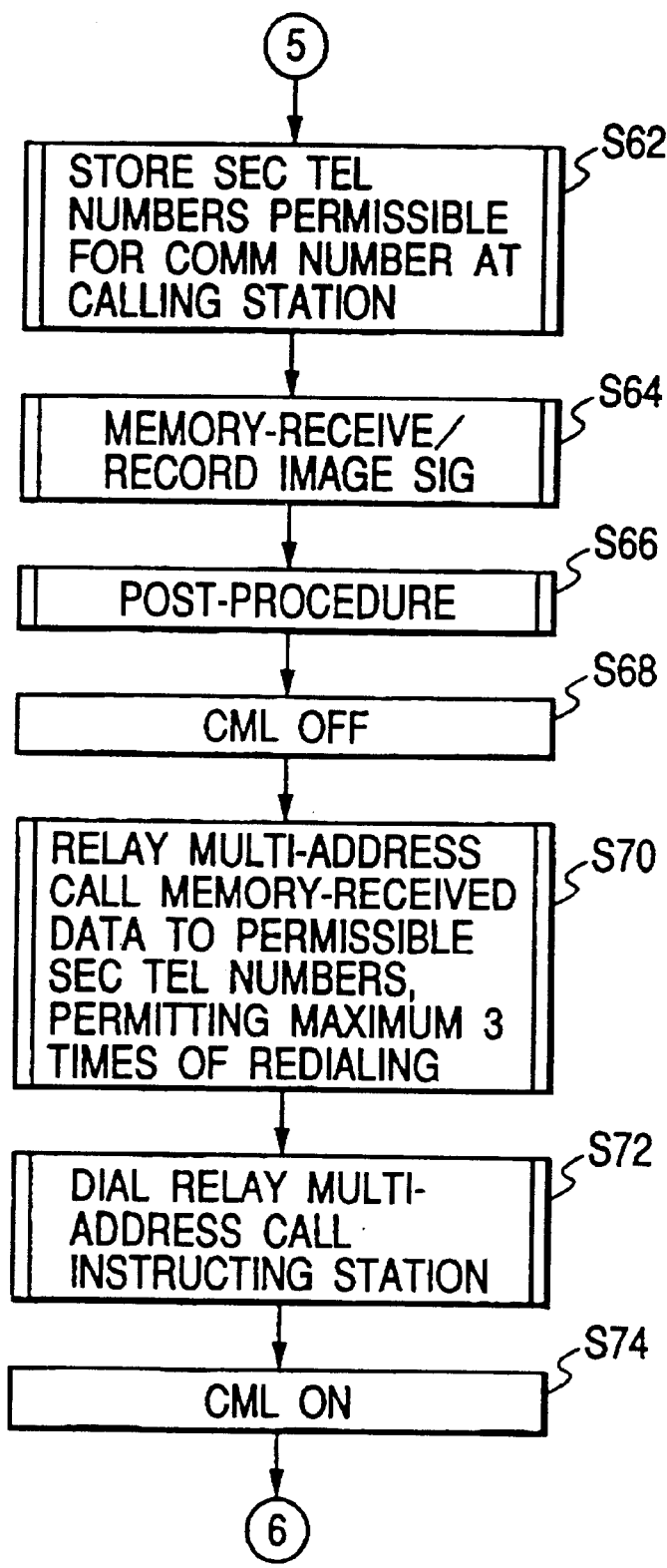
FIG. 5 is a flowchart showing the operation of Embodiment 1.
Figure 6:
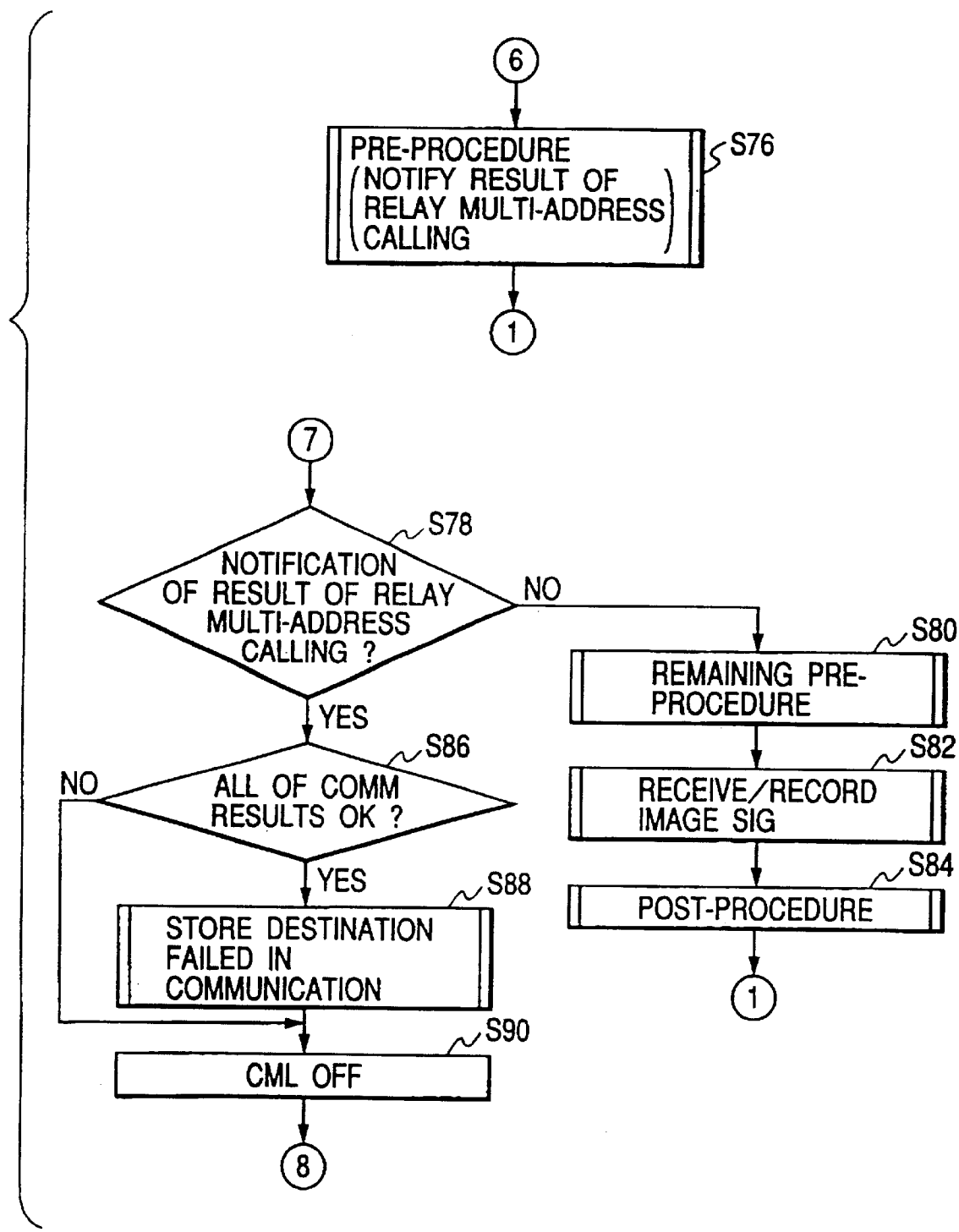
FIG. 6 is a flowchart showing the operation of Embodiment 1.
Figure 7:
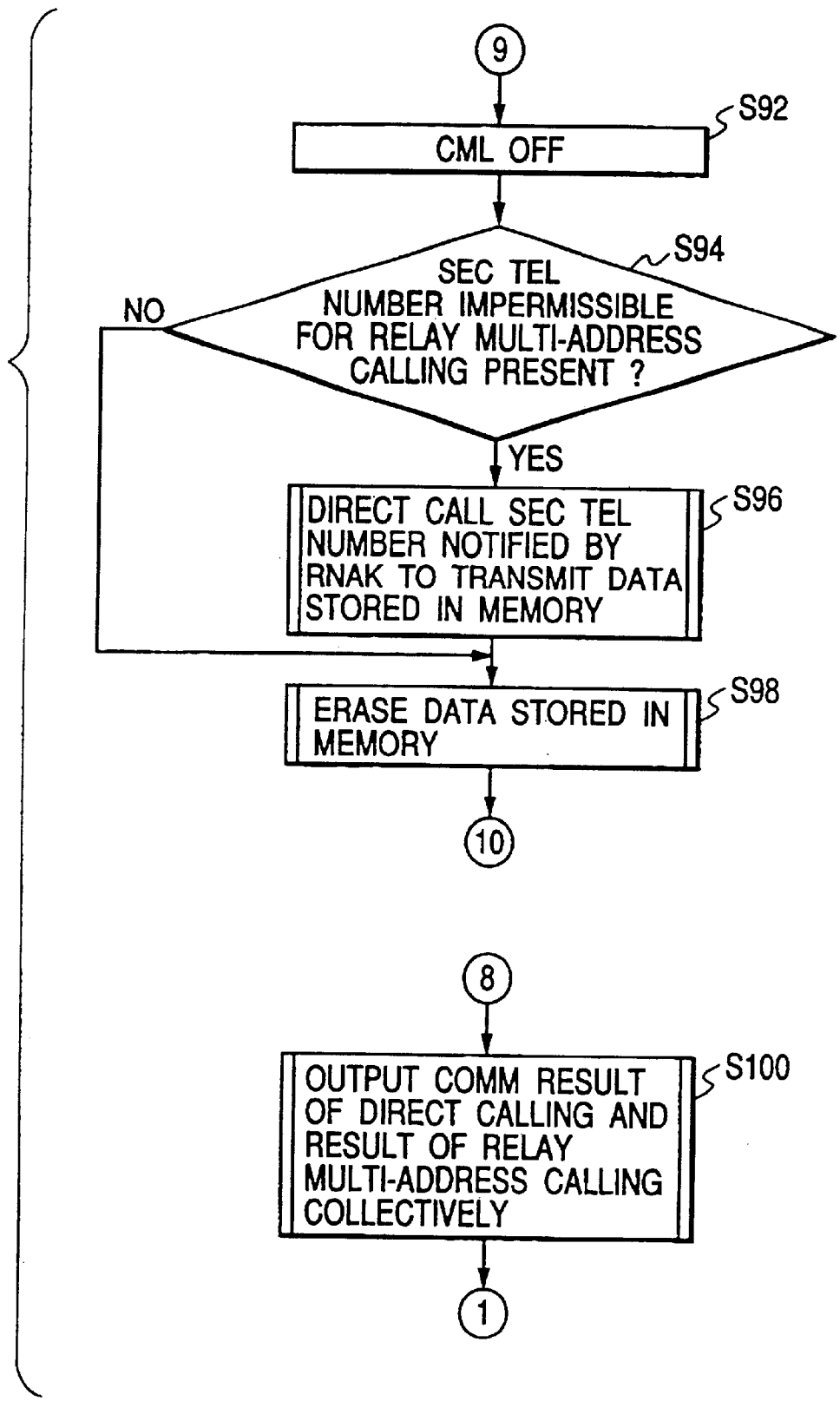
FIG. 7 is a flowchart showing the operation of Embodiment 1.

In FIG. 2, the operation starts at S0 and the communication number 0001 is set. At S4, the data of the registering circuit 26 is cleared via the signal line 26a. At S6, that of the registering circuit 28 is cleared via the signal line 28a.

At S8, a signal of signal level "0" is output to the signal line 20a to turn OFF the CML. At S10, a signal of signal level "0" is output to the signal line 20d as not to send out the ANSam signal.

At S12, the data of the signal line 24a is input to judge whether the registration to the registering circuit 26 has been selected. If the registration is selected, the control proceeds to S14 to register the one-touch dials and shortcut dials into the registering circuit 26 via the signal line 26a, then proceeding to S16. If not selected, the control proceeds to S16 as left alone.

At S16, whether or not CALLING has been selected is judged, and at S18, whether or not CALLED has been selected is judged. The control proceeds to S22 if CALLING has been selected, and proceeds to S50 if CALLED has been selected. If neither selected, the control proceeds to S20 to execute another processing.

At S22, the data of the signal line 24a is input to judge whether a designated secondary telephone number is present or absent. The control proceeds to S24 if present and it proceeds to S40 if absent.

At S24, a signal of signal level "1" is output to the signal line 20a to turn ON the CML. At S26, the pre-procedure is executed, then the secondary telephone numbers are notified with sub-address signals in such a form as #1234#1235#1236, communication numbers are notified with an NSS signal and further a telephone number of a calling station is notified with a TSI signal.

At S28, whether or not an RNAK (Receive NAK) signal has been received is judged, and at S30, whether or not a CFR signal has been received is judged. If the RNAK signal has been received, the control proceeds to S32 to store a relay multi-address calling impermissible secondary telephone number, then proceeding to S36. If the CFR signal has been received, the control proceeds to S34 to store the absence of the relay multi-address calling impermissible secondary telephone number, then proceeding to S36. Otherwise, the control proceeds to S26.

At S36, the sending and memory storing of an image signal is executed and the post-procedure is executed at S38. Thereafter, the control proceeds to S92.

At S40, a signal of signal level "1" is output to the signal line 20a to turn ON the CML. At S42, the pre-procedure is executed and no sub-address signal is sent. Next, an image signal is transmitted at S44 and the post-procedure is executed at S46. Then, the communication number is incremented by one at S48 and the control proceeds to S8.

At S50, a signal of signal level "1" is output to the signal line 20a to turn ON the CML. At S52, the pre-procedure is executed to store a telephone number of the calling station.

At S54, it is judged whether the secondary telephone number has been received by a SUB signal. The control proceeds to S56 if received and it proceeds to S78 if not.

At S56, considering the destinations registered in one-touch dials and in shortcut dials as the relay multi-address calling permissible destinations, it is judged whether or not all the secondary telephone numbers as received are registered in the registering circuit 26. In case of affirmative acknowledge, the control proceeds to S58 to transmit the CFR signal, then proceeding to S62.

In case of negative acknowledge, the control proceeds to S60 to transmit the RNAK signal. Since no relay multi-address calling is executed to a destination unregistered in the registering circuit 26 among the secondary telephone numbers, the negative acknowledge is notified to the partner station. Thereafter, the control proceeds to S62.

At S62, the relay multi-address calling permissible secondary telephone numbers are stored for the communication number at the calling station.

At S64, memory receive/record of an image signal is made and the post-procedure is executed at S66. And, at s68, a signal of signal level "0" is output to the signal line 20a to turn OFF the CML.

At S70, the memory-received data is the relay multi-address calling permissible secondary telephone numbers, where 3 times of re-dialing are permitted at the maximum. At S72, the relay multi-address calling designated destinations are called.

At S74, a signal of signal level "1" is output to the signal line 20a to turn ON the CML. Then, at S76, the pre-procedure is executed to notify the communication result of the relay multi-address calling to the secondary telephone number for the communication number of the calling station. Thereafter, the control proceeds to S8.

At S78, it is judged whether or not the notification is the communication result of the relay multi-address calling and the control proceeds to S86 or S80 according as if yes or not respectively.

At S80, the remaining pre-procedure is executed. An image signal is received and recorded at S82. At S84, the post-procedure is executed and thereafter the control proceeds to SB.

At S86, it is judged whether all of the communication results are OK or not and the control proceeds to S90 if all of them are OK. Even if one of them has failed in communication, the control proceeds to S88 to store the destination of the failure in communication, then proceeding to S90.

At S90, a signal of signal level "0" is output to the signal line 20a to turn OFF the CML. Thereafter, the control proceeds to S100.

At S92, a signal of signal level "0" is output to the signal line 20a to turn OFF the CML. At S94, the RNAK signal is received and it is judged whether there is a secondary telephone number impermissible for relay multi-address calling. If YES, the control proceeds to S96 and if NOT, it does to S98.

At S96, the secondary telephone number impermissible for relay multi-address calling notified with an RNAK signal is directly called and the original data stored in the memory is transmitted. Thereafter, the control proceeds to S98. At S98, the original data recorded in the memory is deleted and then the control proceeds to S48.

At S100, the communication result of directly calling the relay multi-address calling impermissible destinations and that of the relay multi-address calling notified from the relay broadcasted station are output as one communication result. Thereafter, the control proceeds to S8.

Next, Embodiment 2 of the present invention will be described.

As with Embodiment 1, the control circuit 20 in Embodiment 2 controls a facsimile communication according to ITU-U Recommendation T.33. In Embodiment 1, the facsimile apparatus instructed to conduct the relay multi-address calling by using the secondary telephone numbers calls destinations registered in one-touch dials or shortcut dials as the relay multi-address calling permissible destinations, whereas in Embodiment 2 different destinations registered by the above registering circuit 28 are used as the relay multi-address calling permissible destinations.

Figure 8:
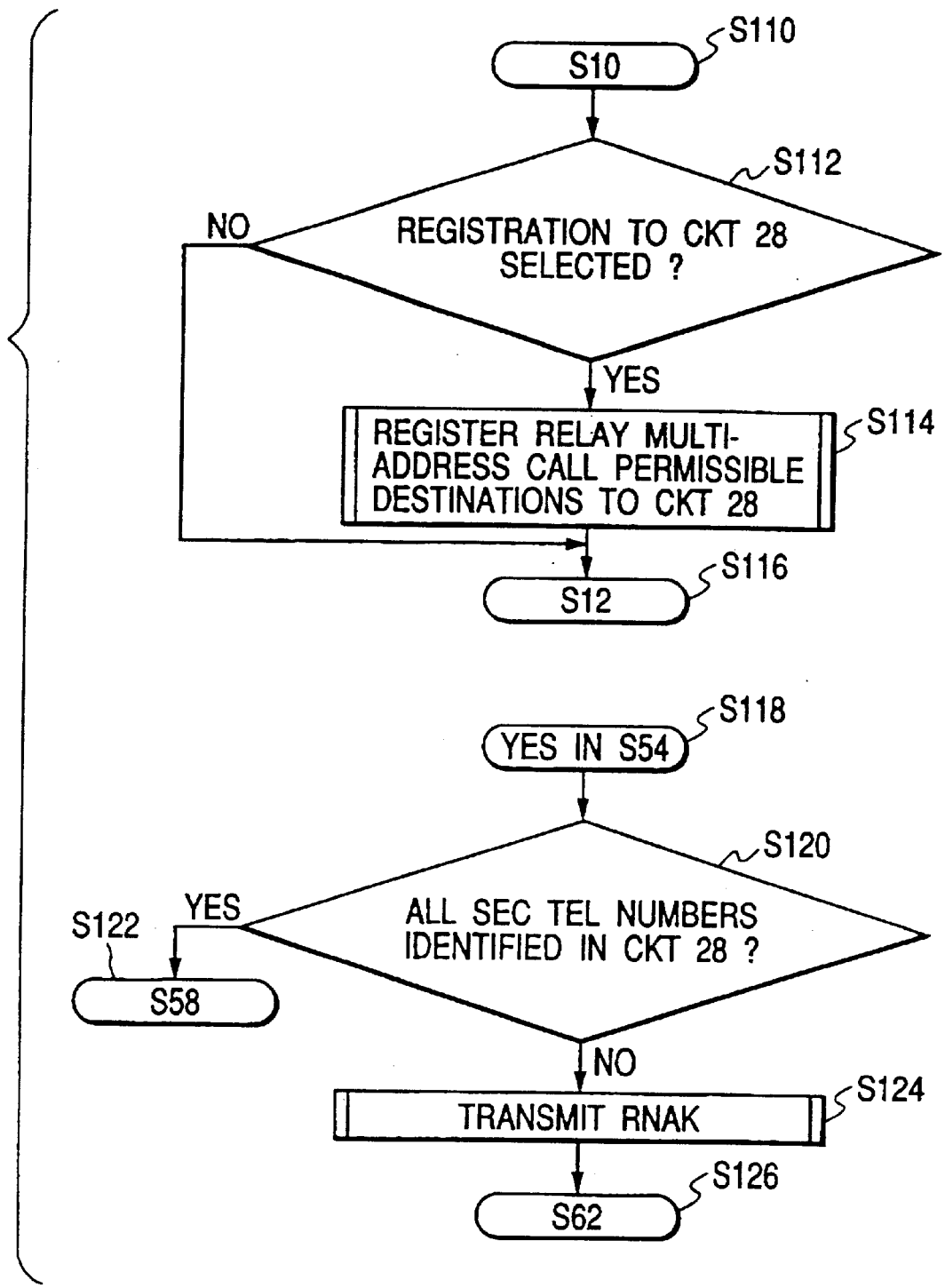
FIG. 8 is a flowchart showing the operation of Embodiment 2.

FIG. 8 is a flowchart showing the portions of Embodiment 2 different in operation from Embodiment 1 (FIGS. 2, 3, 4A, 4B, 5, 6 and 7).

In FIG. 8, S110 corresponds to S10. At S112, data of the signal line 24a is input to judge whether the registration into the registering circuit 28 is selected or not. If selected, the control proceeds to S114 to register the relay multi-address calling permissible destination into the registering circuit 28 via the signal line 28a, then proceeding to S116 (S12). If not selected, the control proceeds to S116 (S12).

S118 represents affirmative acknowledge in S54. Next, at S120, it is judged whether all of the secondary telephone numbers received by the sub-address signals are registered in the registering circuit 28. If YES, the control proceeds to S122 (S58) and if NOT, to S124.

At S124, the RNAK signal is transmitted. Since destinations unregistered in the registering circuit 28 among the secondary telephone numbers are not relay broadcasted, they are notified to the partner station. At S126, the control proceeds to S62.

Next, Embodiment 3 of the present invention will be described.

In a conventional facsimile apparatus capable of communicating sub-address signals, upon reception, its receiving capability is notified to the partner station by an initial identification signal, but the initial identification signal is changed based on a designated sub-address signal for re-transmission.

There is a fault that even when the communication type registered in a memory box corresponding to the designated sub-address signal is e.g., of forwarding, and the receiving capability of a forwarded destination is higher than that of a forwarding station, the forwarded destination is compelled to be limited by the capability of the forwarding station.

Thus, in cases where a sub-address signal is sent upon reception from the partner station and the communication type of a memory box corresponding to this sub-address signal is of forwarding or relay multi-address calling, each of the following Embodiments 3 to 5 enables the forwarding or relay multi-address calling to be executed at a higher capability than the receiving capability of its own station.

Figure 9:
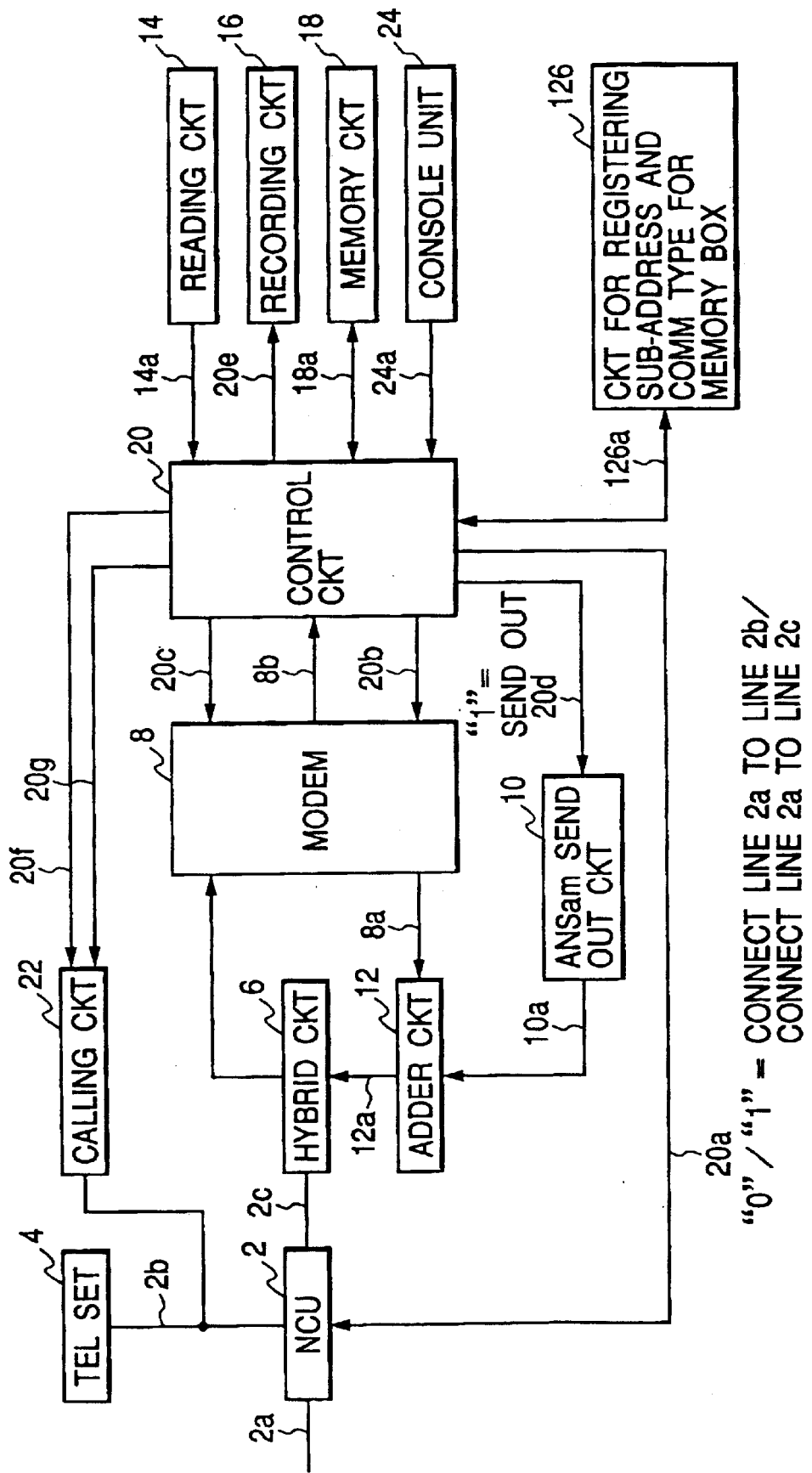
FIG. 9 is a block diagram showing the configuration of a facsimile apparatus used in Embodiment 3 of the present invention.

FIG. 9 is a block diagram showing the configuration of a facsimile apparatus according to Embodiment 3 of the present invention.

In contrast to the configuration shown in FIG. 1, a facsimile apparatus according to Embodiment 3 has a registering circuit 126 provided instead of the registering circuits 26 and 28 removed.

This registering circuit 126, corresponding to a memory box, is a circuit for registering sub-addresses and communication types, which registers them via a signal line 126a. It is assumed, for example, that there are 20 memory boxes of No. 00 to 19, sub-addresses comprising numerals of 0 to 9 in 20 figures at the maximum and # and * and communication types of confidential receive, compulsory memory receive, relay multi-address calling (relay destinations inclusive in registration) and forwarding (forwarded destination inclusive in registration). Besides, the console unit 24 is assumed to be provided with registering keys for the registering circuit 126.

The control circuit 20 according to this embodiment controls the facsimile communication with sub-address signals added. This facsimile apparatus notifies its possessive receiving capability by using an initial discriminating signal at the receiving time. Thereafter, if a sub-address signal is sent from a transmitter station and the communication type corresponding to the sub-address is a specified type (e.g., forwarding or relay multi-address calling), the apparatus notifies a higher capability than its possessive receiving capability again to the transmitter station by using an initial discriminating signal. If no sub-address is transmitted or a sub-address is transmitted but the communication type corresponding to the sub-address is not a specified type, normal facsimile communication is executed.

FIGS. 10 to 13 are flowcharts showing the flow of control by the control circuit 20 according to Embodiment 3.

Figure 10:
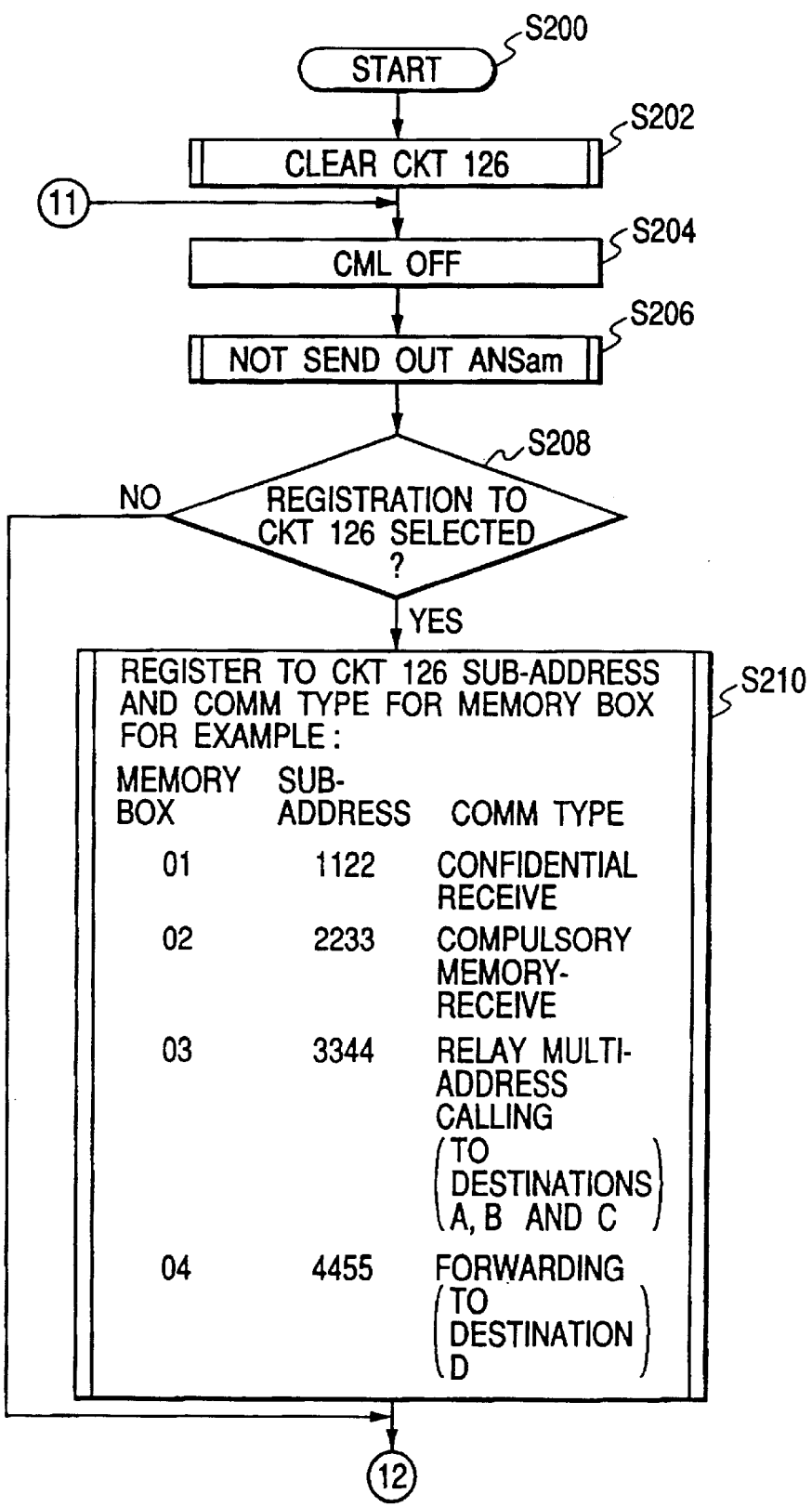
FIG. 10 is a flowchart showing the operation of Embodiment 3.
Figure 11:
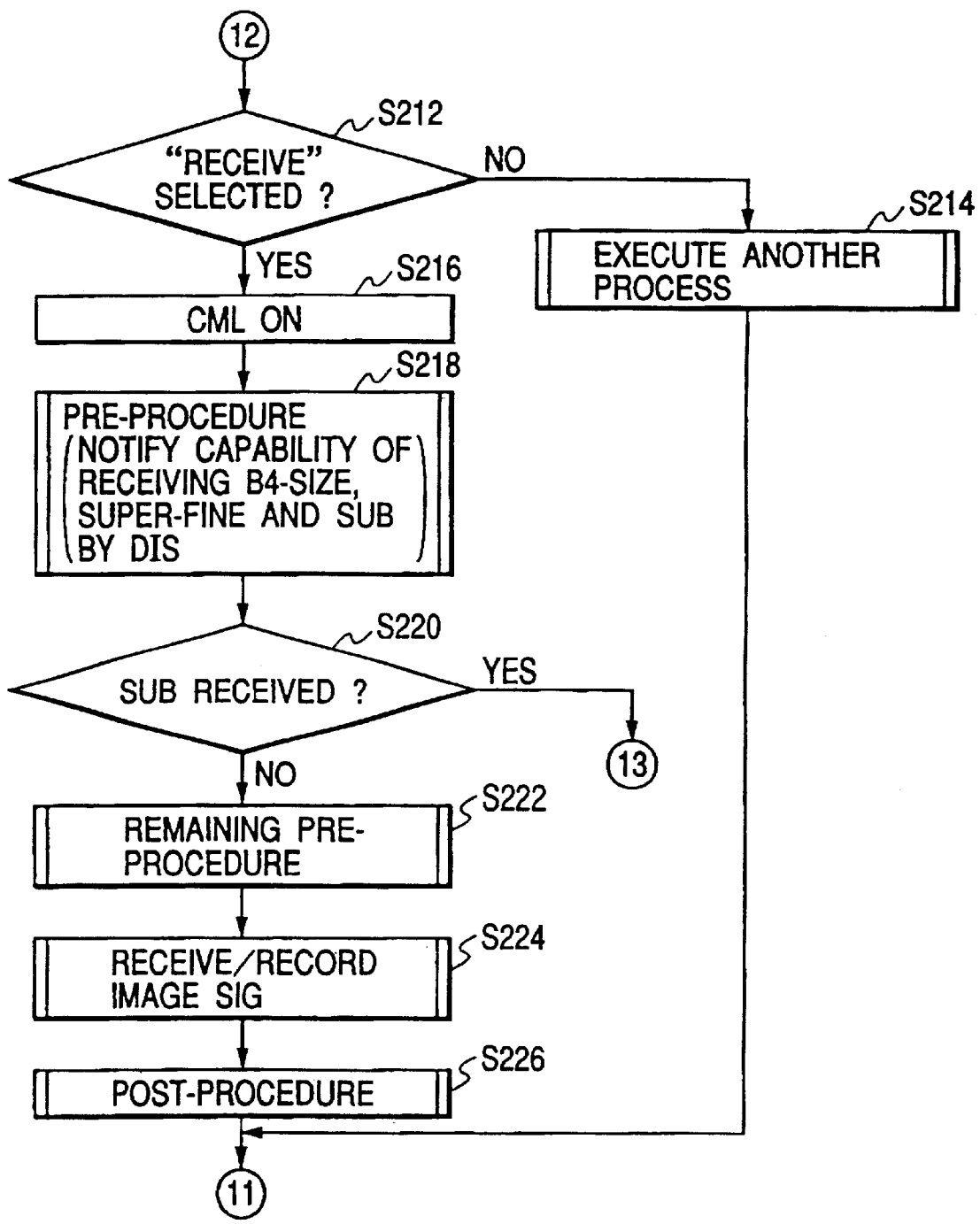
FIG. 11 is a flowchart showing the operation of Embodiment 3.
Figure 12:
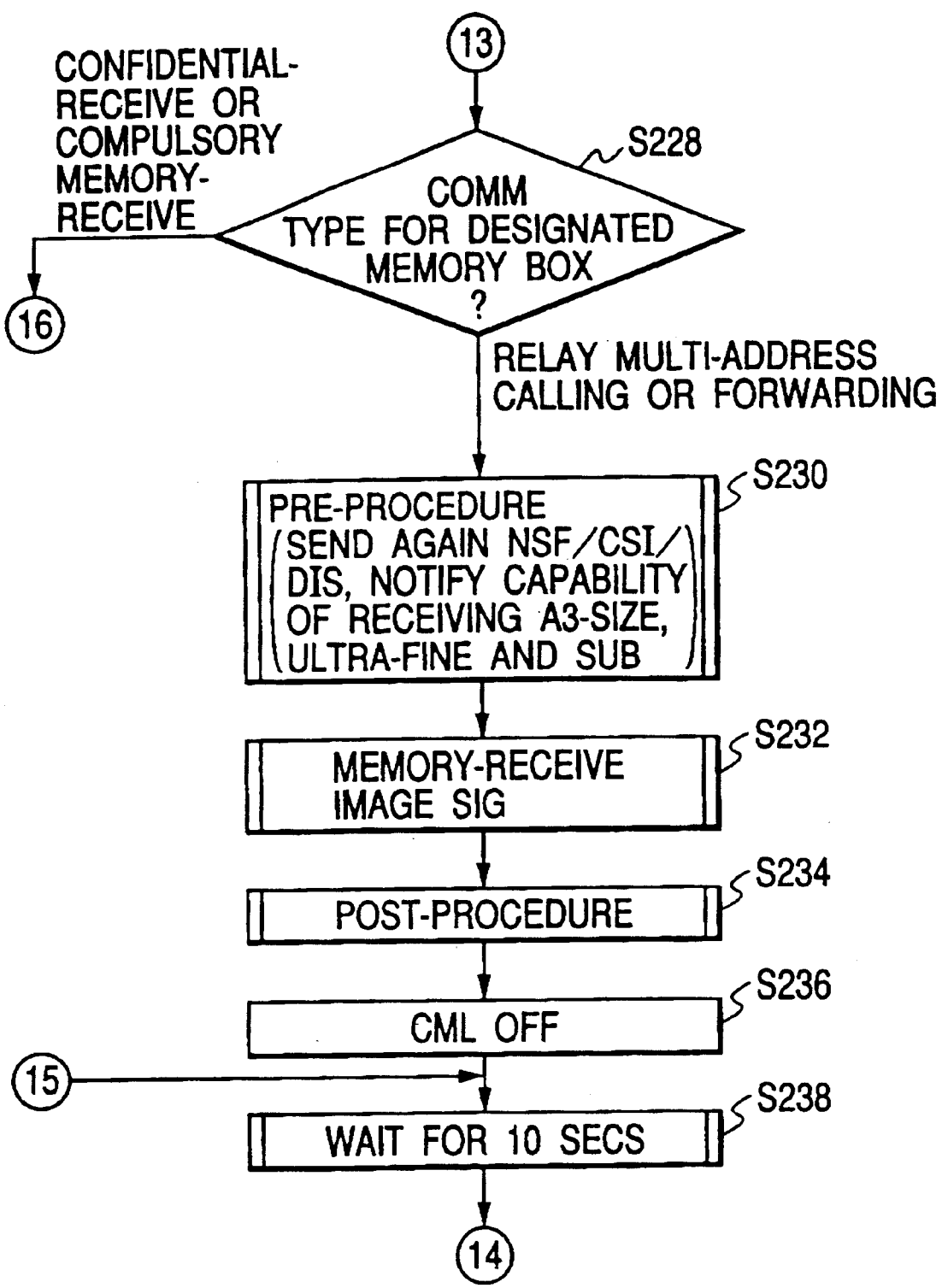
FIG. 12 is a flowchart showing the operation of Embodiment 3.
Figure 13:
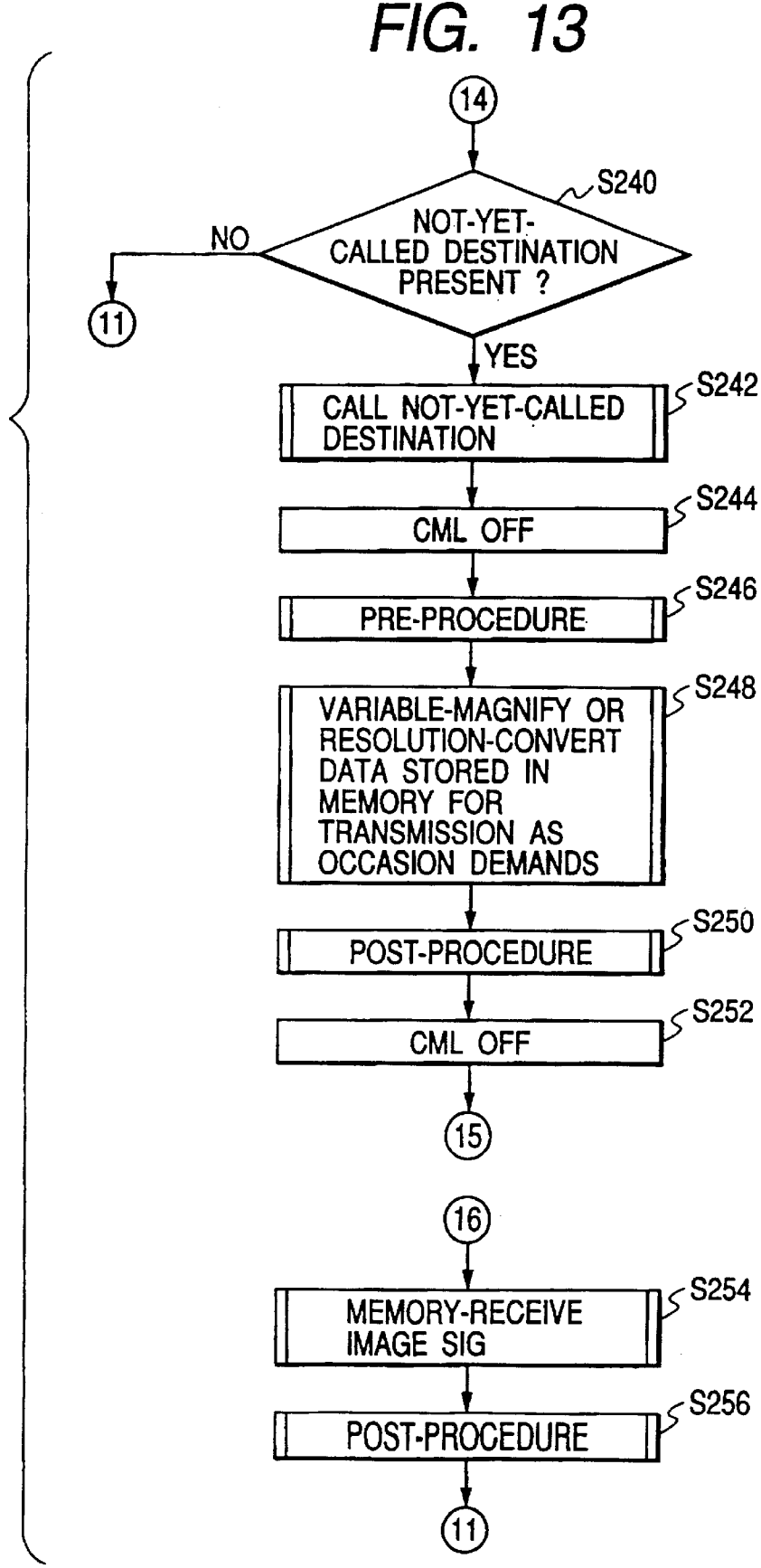
FIG. 13 is a flowchart showing the operation of Embodiment 3.

In FIG. 10, the operation starts at S200, all of the data registered in the registering circuit 126 are cleared via the signal line 126a at S202. At S204, a signal of signal level "0" is output to the signal line 20a to turn OFF the CML. At S206, a signal of signal level "0" is output to the signal line 20d to transmit no ANSam signal.

At S208, data of the signal line 24a is input to judge whether the registration into the registering circuit 126 has been selected or not. If YES, the control proceeds to S210, and if NOT, to S212.

At S210, sub-addresses and communication types are registered corresponding to memory boxes into the registering circuit 126 via the signal line 126a. Registered as memory box, sub-address, communication type, for example, are (01, 1122, confidential receive), (02, 2233, compulsory memory receive), (03, 3344, relay multi-address calling to destinations A, B and C), (04, 4455, forwarding to destination D), . . .

At S212, it is judged whether "receive" is selected or not. If YES, the control proceeds to S216, and if NOT, to S214.

S214 represents the execution of other processes. If the output of confidential receive is selected here, after input of password confidential receive data is output, and if the output of compulsory memory receive is selected, data is output under the depression of the start key. Thereafter, the control proceeds to S204.

At S216, a signal of signal level "1" is output to the signal line 20a to turn ON the CML.

S218 represents the execution of a pre-procedure. Here, by using a DIS signal, capability of receiving maximally B4-sized data (specifically, capability of receiving A4- and B4-sized data), capability of receiving data in the maximally super-fine mode (capability of receiving data in the standard mode (8 pel/mm in the main scanning direction and 3.85 line/mm in the sub-scanning direction), the fine mode (8 pel/mm in the main scanning direction and 7.71 line/mm in the sub-scanning direction) and the super-fine mode (8 pel/mm in the main scanning direction and 15.4 line/mm in the sub-scanning direction)), and capability of receiving a sub-signal are notified to the party set.

At S220, it is judged whether or not a SUB-signal has been received. If YES, the control proceeds to S228, and if NOT to S222.

S222, S224 and S226 represent the execution of the remaining pre-procedure, the receive/record of an image signal and a post-procedure, respectively. Thereafter, the control proceeds to S204.

At S228, data of the signal line 126a is input to check the communication type of the memory box designated with the SUB signal. If it is either relay multi-address calling or forwarding, the control proceeds to S230, and if either confidential receive or compulsory memory receive, the control proceeds to S254.

At S230, a pre-procedure is executed. Here, an initial discriminating signal (specifically, NSF/CSI/DIS signal) is sent again. Here, notified to the partner station by using a DIS signal are capability of receiving maximally A3-data (specifically, capability of receiving A4-, B4- and A3-sized data), capability of receiving data in the maximally ultra-fine mode (capability of receiving data in the standard mode, the fine mode, the super-fine mode and the ultra-fine mode (16 pel/mm in the main scanning direction and 15.4 line/mm in the sub-scanning direction), and capability of receiving a SUB signal.

At S232 and S234, the memory receive of an image signal and a post-procedure are executed in sequence. At S236, a signal of signal level "0" is output to the signal line 20a to turn OFF the CML. At S238, the waiting time is taken for 10 sec.

At S240, in the relay multi-address calling or forwarding selected as the communication type of the memory box corresponding to a sub-address signal, it is judged whether a not-yet-called destination is present or absent. If present, the control proceeds to S242, and if absent, to S204.

At 242, the not-yet-called destination is called by means of the calling circuit 22. At S244, a signal of signal level "1" is output onto the signal line 20a to turn ON the CML. After the execution of a preprocedure at S246, data stored in a memory is magnified variably or converted in resolution for transmission according as the occasion demands at S248.

At S250, a post-procedure is executed. Then at S252, a signal of signal level "0" is output onto the signal line 20a to turn OFF the CML. Thereafter, the control proceeds to S238.

At S254, since confidential receive or compulsory memory receive has been selected as the communication type of the memory box corresponding to the sub-address signal, memory receive of an image signal is executed. And, S256 represents the execution of a post-procedure. Thereafter, the control proceeds to S204.

Next, Embodiment 4 of the present invention will be described.

Figure 14:
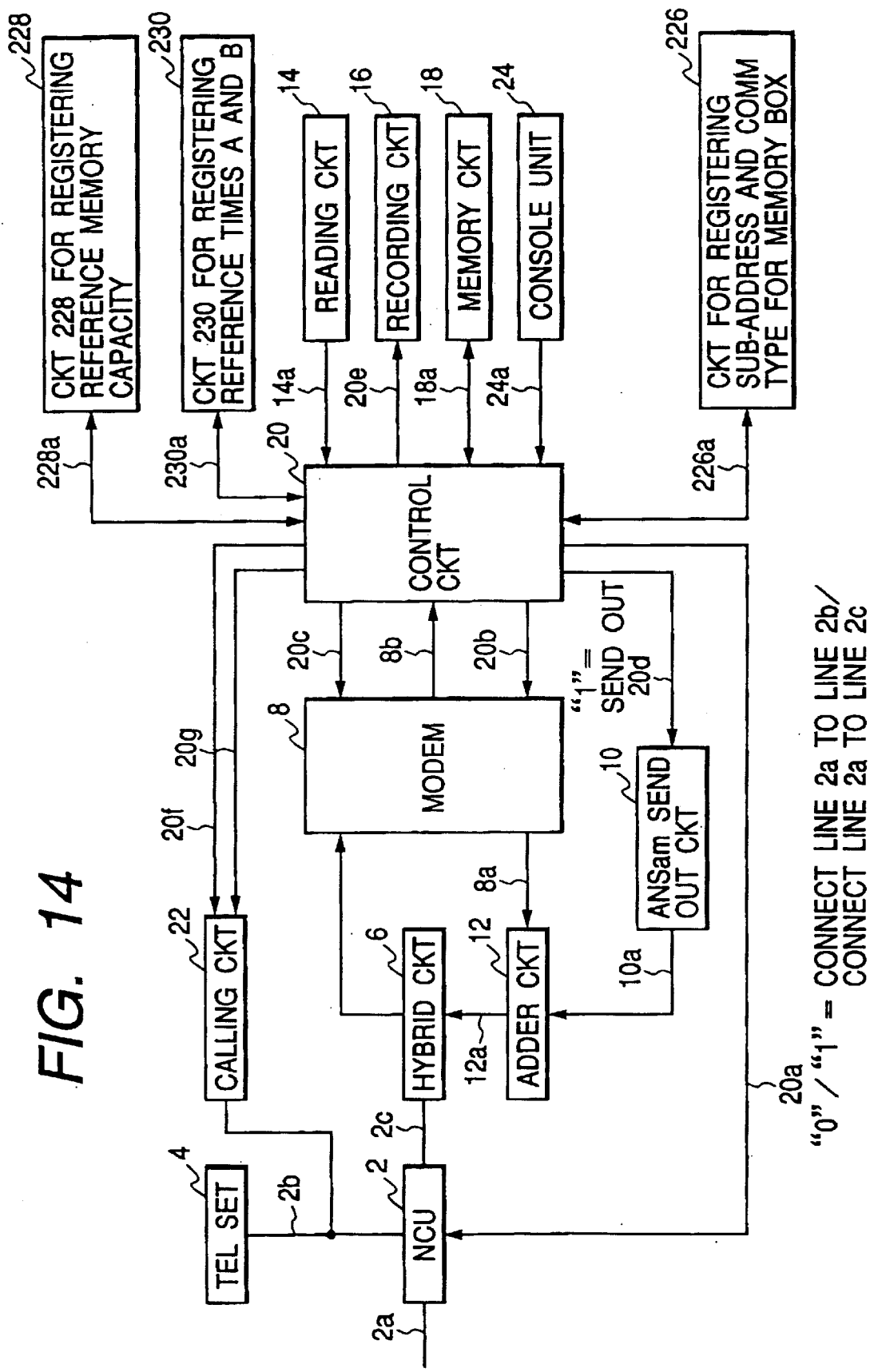
FIG. 14 is a block diagram showing the configuration of a facsimile apparatus employed in Embodiments 4 and 5 of the present invention.

FIG. 14 is a block diagram showing the configuration of a facsimile apparatus according to Embodiments 4 and 5 of the present invention.

In contrast to the configuration shown in FIG. 1, the facsimile apparatus shown in FIG. 14 has registering circuits 226, 228 and 230 provided instead of the registering circuits 26 and 28 removed.

The registering circuit 226, corresponding to a memory box, is a circuit for registering sub-addresses and communication types, where memory boxes 01, 02 and 03, for example, are assumed to be registered via the signal line 226a for confidential reception with the sub-address 0012, for relay multi-address calling to the destinations A and B with the sub-address 0015 and for forwarding to the destination C with the sub-address 0018, respectively.

If an available memory capacity is more than a reference value when forwarding or relay multi-address calling has been instructed by a sub-address signal, the reception capability for the forwarding or the relay multi-address calling is sent again with an initial discriminating signal. The registering circuit 228 is a circuit for registering the reference value (e.g., 1 M byte) serving for a criterion via the signal line 228a.

If it is in the range of reference time B to reference time A when forwarding or relay multi-address calling has been instructed by the sub-address signal, the reception capability for the forwarding or the relay multi-address calling is sent again with an initial discriminating signal. The registering circuit 230 is a circuit for registering these reference times A, e.g., 8:00, and B, e.g., 22:00, via the signal line 230a.

The console unit 24 according to this Embodiment is assumed to have registering keys for the registering circuits 226, 228 and 230. And, the memory circuit 18 is assumed to have a memory of 4 M byte in common for receiving and sending.

Furthermore, the control circuit 20 according to Embodiment 4 of the present invention controls the facsimile communication using a sub-address signal. The operation is so controlled by using the registering circuits 226 and 228 that an initial identification signal (for notifying the reception capability for forwarding or relay multi-address calling) of higher receiving capability is sent again if the available memory capacity is not less than a reference value (e.g., 1 M byte) and forwarding or relay multi-address calling is instructed with a sub-address signal, or otherwise, no initial identification signal is sent again to move to the next step of communication control.

FIGS. 15 to 19 are flowcharts showing the flow of control by the control circuit 20 according to Embodiment 4 of the present invention.

Figure 15:
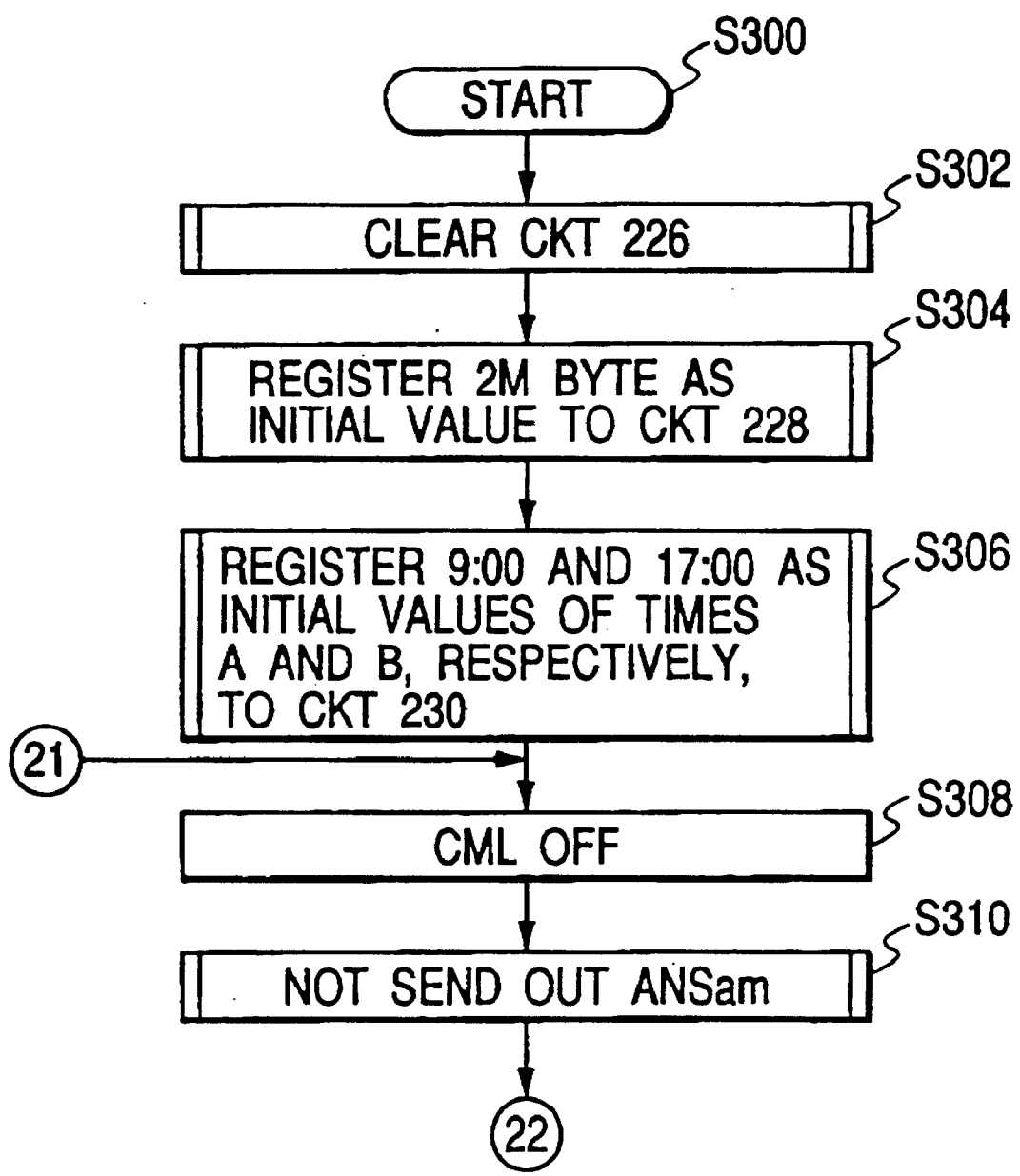
FIG. 15 is a flowchart showing the operation of Embodiment 4.
Figure 16:
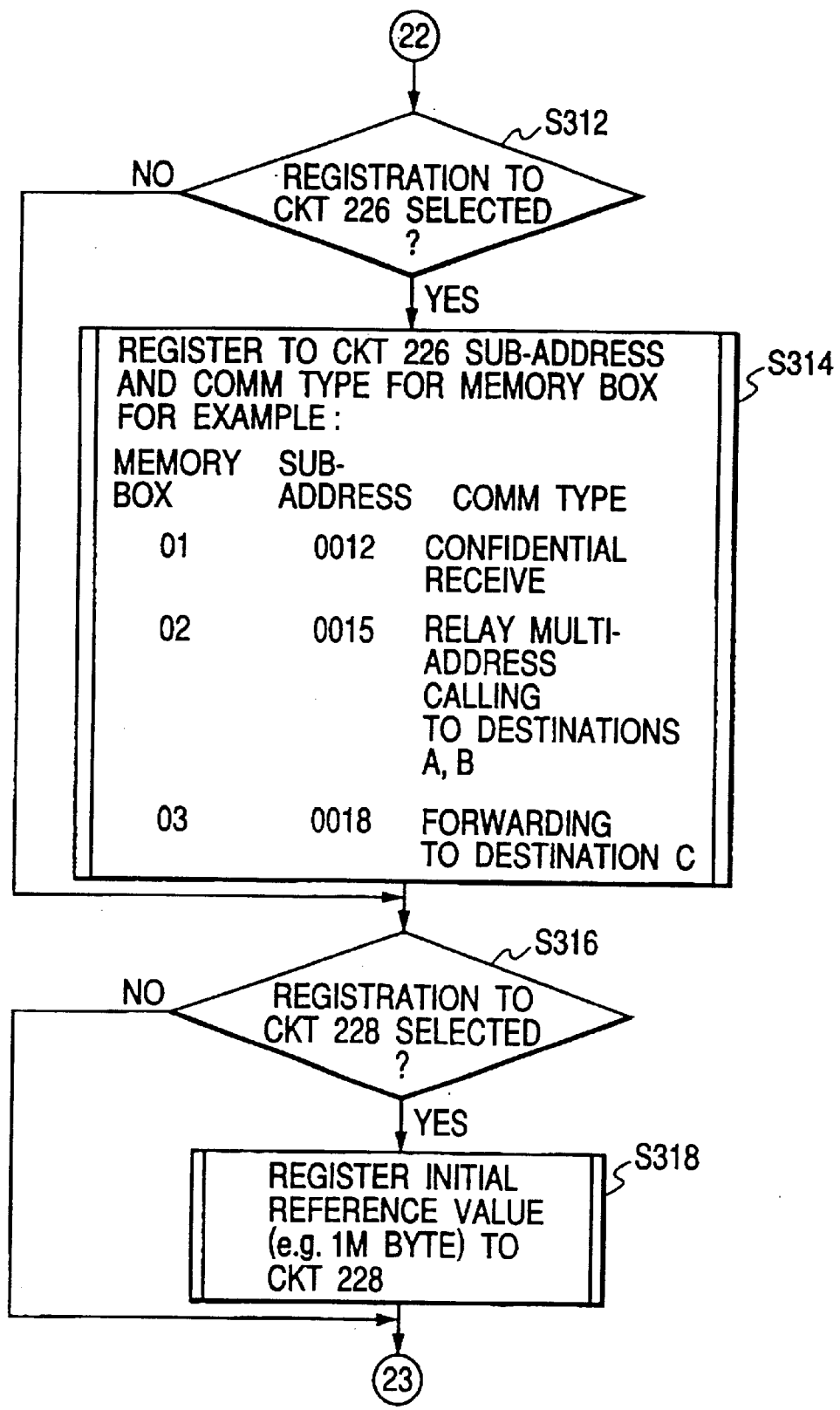
FIG. 16 is a flowchart showing the operation of Embodiment 4.
Figure 17:
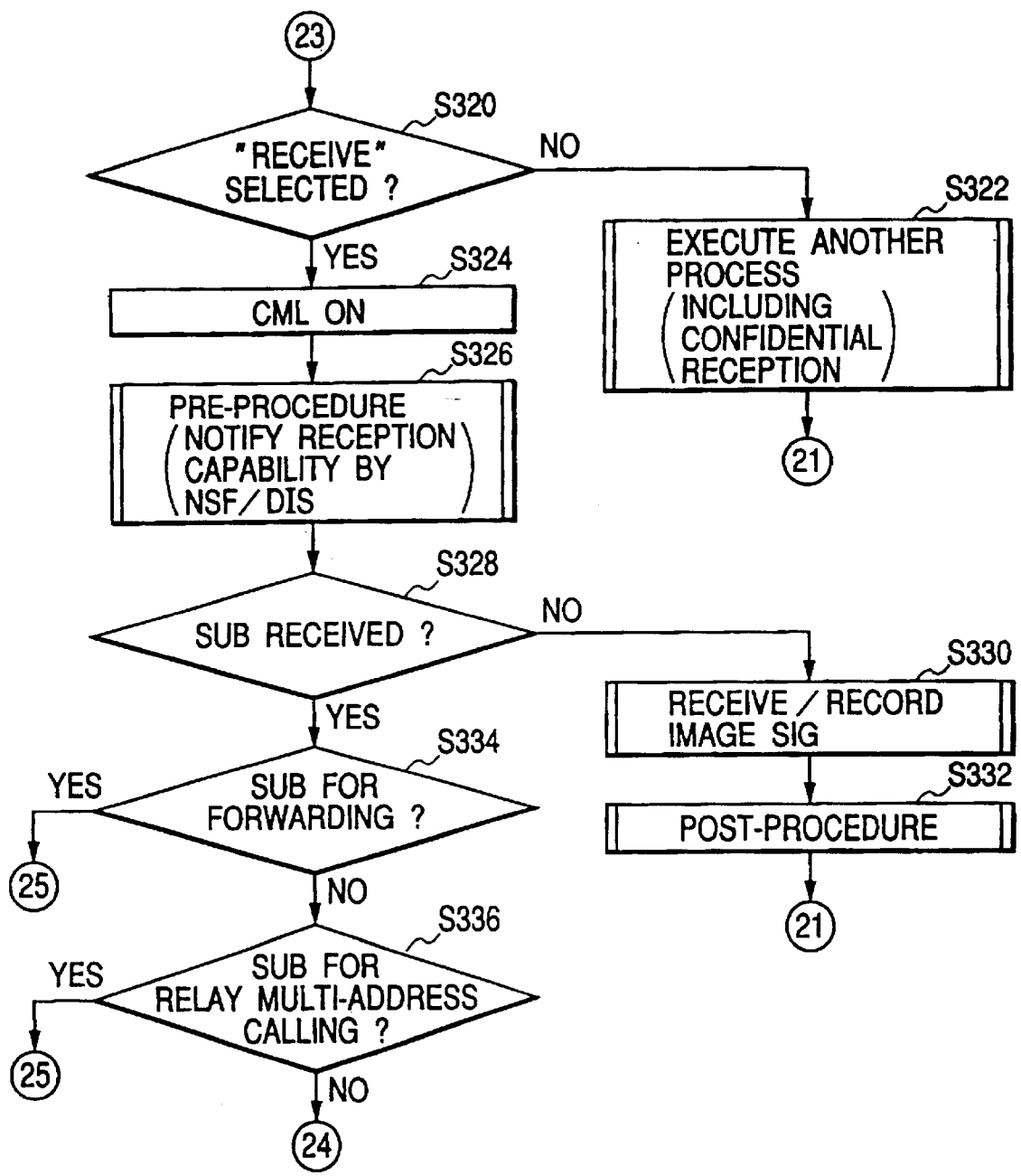
FIG. 17 is a flowchart showing the operation of Embodiment 4.
Figure 18:
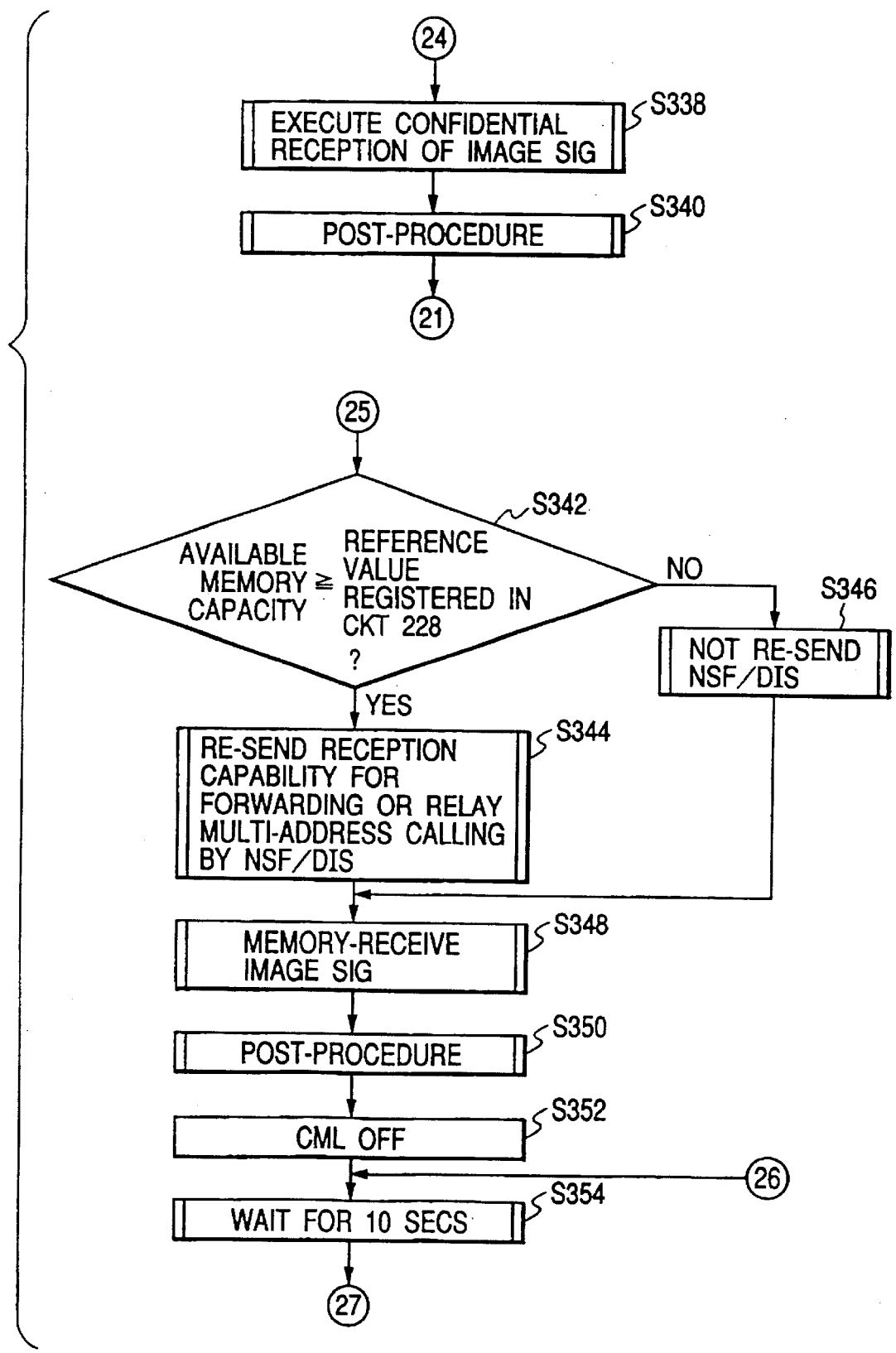
FIG. 18 is a flowchart showing the operation of Embodiment 4.
Figure 19:
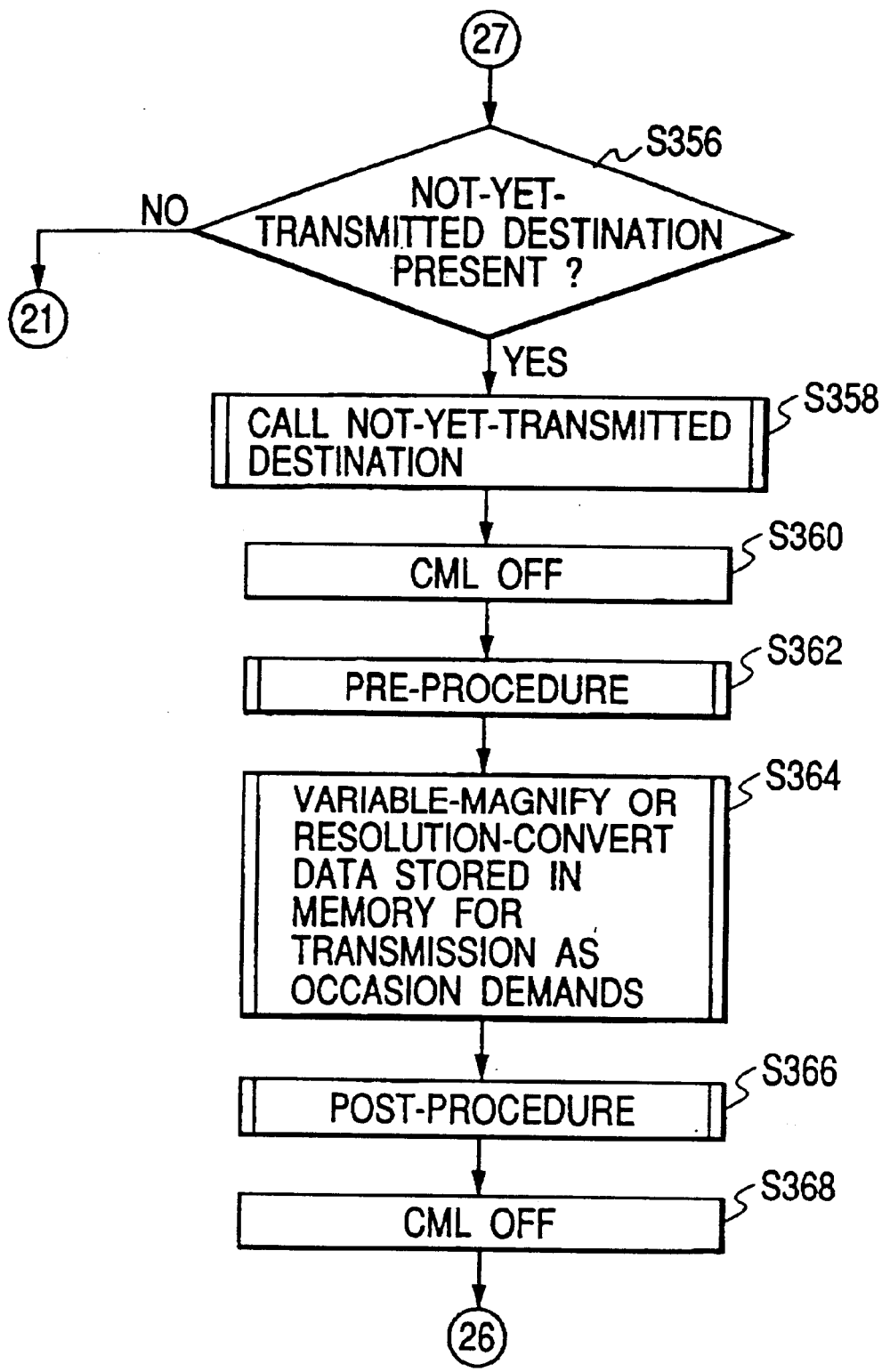
FIG. 19 is a flowchart showing the operation of Embodiment 4.

In FIG. 15, the operation starts at S300, the data registered in the registering circuit 226 are cleared via the signal line 226a at S302. At S304, an initial value of the reference memory capacity is registered as 2 M bytes into the registering circuit 228 via the signal line 228a. At S306, 9:00 and 17:00 are registered into the registering circuit 230 via the signal line 230a as initial values of the reference times A and B, respectively.

At S308, a signal of signal level "0" is output onto the signal line 20a to turn OFF the CML. At S310, a signal of signal level "0" is output to the signal line 20d to transmit no ANSam signal.

At S312, data of the signal line 24a are input to judge whether the registration into the registering circuit 226 has been selected or not. If YES, the control proceeds to S314, and if NOT, to S316.

At S314, sub-addresses and communication types are registered corresponding to memory boxes into the registering circuit 226 via the signal line 226a. Registered as (memory box, sub-address, communication type), for example, are (01, 0012, confidential receive), (02, 0015, relay multi-address calling to destinations A and B), (03, 0018, forwarding to destination C) . . .

At S316, data of the signal line 24a are input to judge whether the registering into the circuit 228 is selected. If the registering is selected, the control proceeds to S318 to register the reference memory capacity, e.g. 1 M byte, into the registering circuit 228 via the registering line 328a, then proceeding to S320. If not, the control directly proceeds to S320.

At S320, it is judged whether "receive" is selected or not. If YES, the control proceeds to S324, and if NOT, to S322.

At S322, other processes are executed. Here, the process of outputting the confidential receive data is also included. Thereafter, the control proceeds to S308.

At S324, a signal of signal level "1" is output to the signal line 20a to turn ON the CML. At S326, a pre-procedure is executed. Here, the reception capability of its own station is notified with an NSF/DIS signal. For example, capability of receiving maximally B4-sized (A4- and B4-sized) data in the maximally super-fine mode (standard, fine and super-fine modes) is declared.

At S328, it is judged whether a SUB signal is received or not. If YES, the control proceeds to S334, and if NOT, to S330.

At S330 and S332, the sending/recording of an image signal and a post-procedure are executed in sequence and then the control proceeds to S308.

At S334 and S336, the communication type of the memory box corresponding to a sub-address is judged. If either forwarding or relay multi-address calling, the control proceeds to S342, and if confidential receive, it proceeds to S338 respectively. At S338 and S340, the confidential receive of an image signal and a post-procedure are executed in sequence and the control proceeds to S308.

At S342, it is judged via the signal line 228a whether or not the available memory capacity is greater than or equal to the memory capacity registered in the registering circuit 228 and the control proceeds to S344 and S346 respectively for affirmative acknowledge and for negative acknowledge.

At S344, the reception capability for forwarding or relay multi-address calling, e.g., the capability of receiving maximally A-3 sized (A-4, B-4 and A-3 sized) data in the maximally ultra-fine mode (standard, fine, super-fine and ultra-fine modes), is notified to the partner station by re-sending an NSF/DIF signal. Thereafter, the control proceeds to S348.

On the other hand, at S346, no NSF/DIS signal is re-sent and thereafter the control proceeds to S348.

At S348 and S350, the memory receive of an image signal and a post-procedure are executed in sequence. At S352, a signal of signal level "0" is output onto the signal line 20a to turn OFF the CML.

And after a waiting time of 10 seconds at S354, it is judged at S356 whether a not-yet-sent destination is present or absent. If present, the control proceeds to S358, and if absent, to S308.

At S360, a signal of signal level "1" is output onto the signal line 20a to turn ON the CML. After the execution of a pre-procedure at S362, data stored in a memory are magnified variably or converted in resolution for transmission according as the occasion demands at S364.

After the execution of a post-procedure at S366, a signal of signal level "0" is output onto the signal line 20a to turn OFF the CML at S368. Thereafter, the control proceeds to S354.

Next, Embodiment 5 of the present invention will be described.

The control circuit 20 according to Embodiment 5 controls the facsimile communication using a sub-address signal. And, the operation is so controlled by using the registering circuits 226 and 230 that an initial identification signal (for notifying the reception capability for forwarding or relay multi-address calling) of higher reception capability is sent again if it is in the range of a reference time B to a reference time A and the forwarding or relay multi-address calling is instructed with a sub-address signal. Otherwise no initial identification signal is sent again to move to the next step of communication control.

Figure 20:
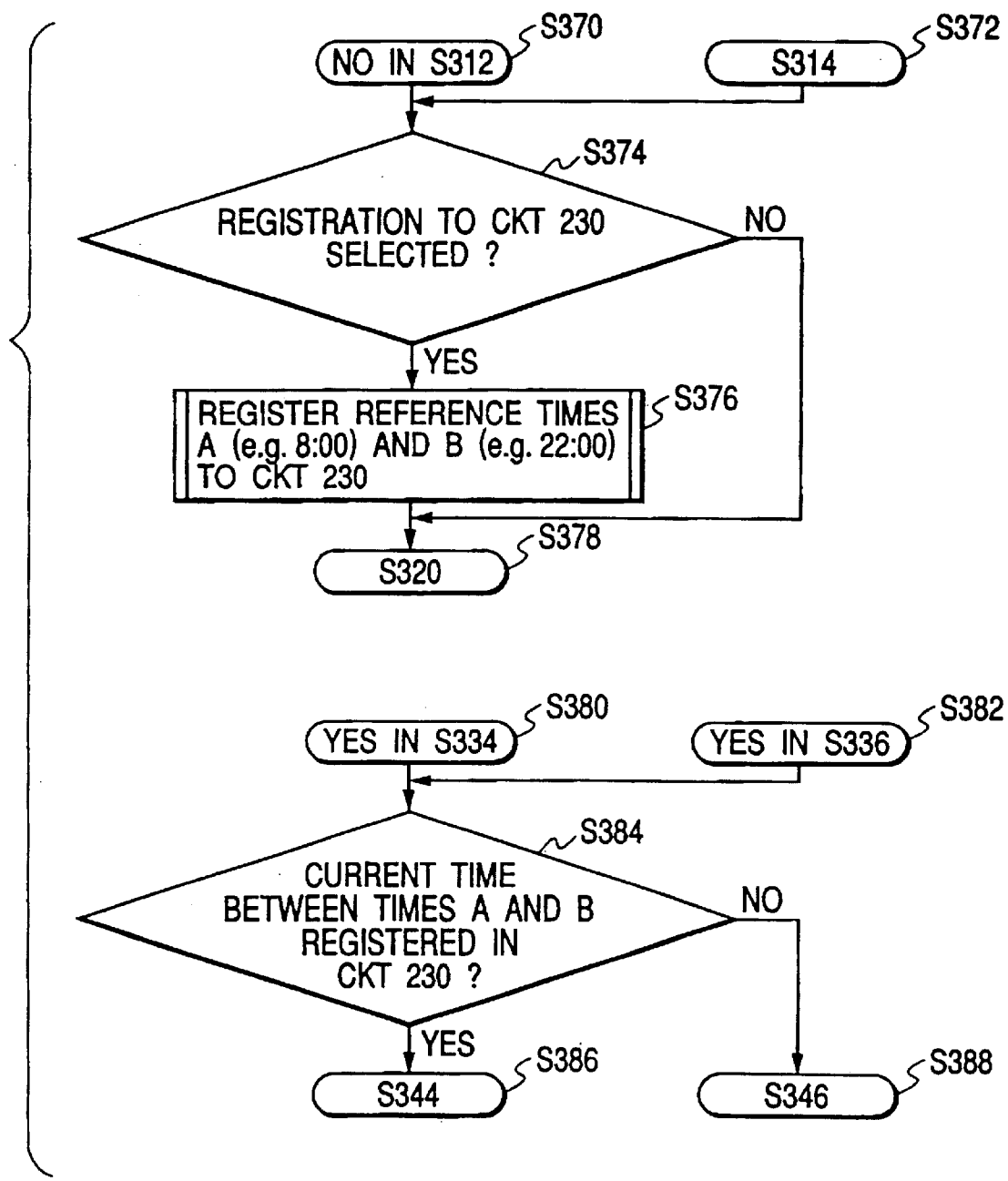
FIG. 20 is a flowchart showing the operation of Embodiment 5.

FIG. 20 is a flow chart showing portions of Embodiment 5, different in the operation of the control circuit 20 from Embodiment 4 (FIGS. 15 to 19).

In FIG. 20, S370 represents negative acknowledge of S312, whereas S372 represents S314. And, at S374, data of the signal line 24a is input to judge whether registration into the registering circuit 230 has been selected or not. If selected, the control proceeds to S376 to register the reference times A and B, e.g., 8:00 and 22:00 in the circuit 230 via the line 230a, then proceeding to S378 (S320). If not, the control directly proceeds to S378 (S320).

S380 and S382 represent affirmative acknowledge of S334 and affirmative acknowledge of S336, respectively. And, at S384, it is judged whether the current time lies between the predetermind times A and B registered in the registering circuit 230. If YES, the control proceeds to S386 (S344), and if NOT, to S388 (S346).

Next, Embodiment 6 of the present invention will be described.

When relay multi-address calling is instructed with a sub-address signal in a conventional relay multi-address calling executable facsimile apparatus using the sub-address signal, the relay multi-address calling has been successively attempted to destinations registered for memory boxes. If some designated destinations have failed in the communication, they are called to send image data thereto.

In this case, if an operator has instructed urgent relay multi-address calling and believes that the whole relay multi-address calling ends normally, he/she may loses an important business chance because communication to target partners may terminated with failure.

Thus, Embodiments 6 and 7 provide a facsimile apparatus capable of executing an effective notification to the sender side when the relay multi-address calling has failed.

Figure 21:
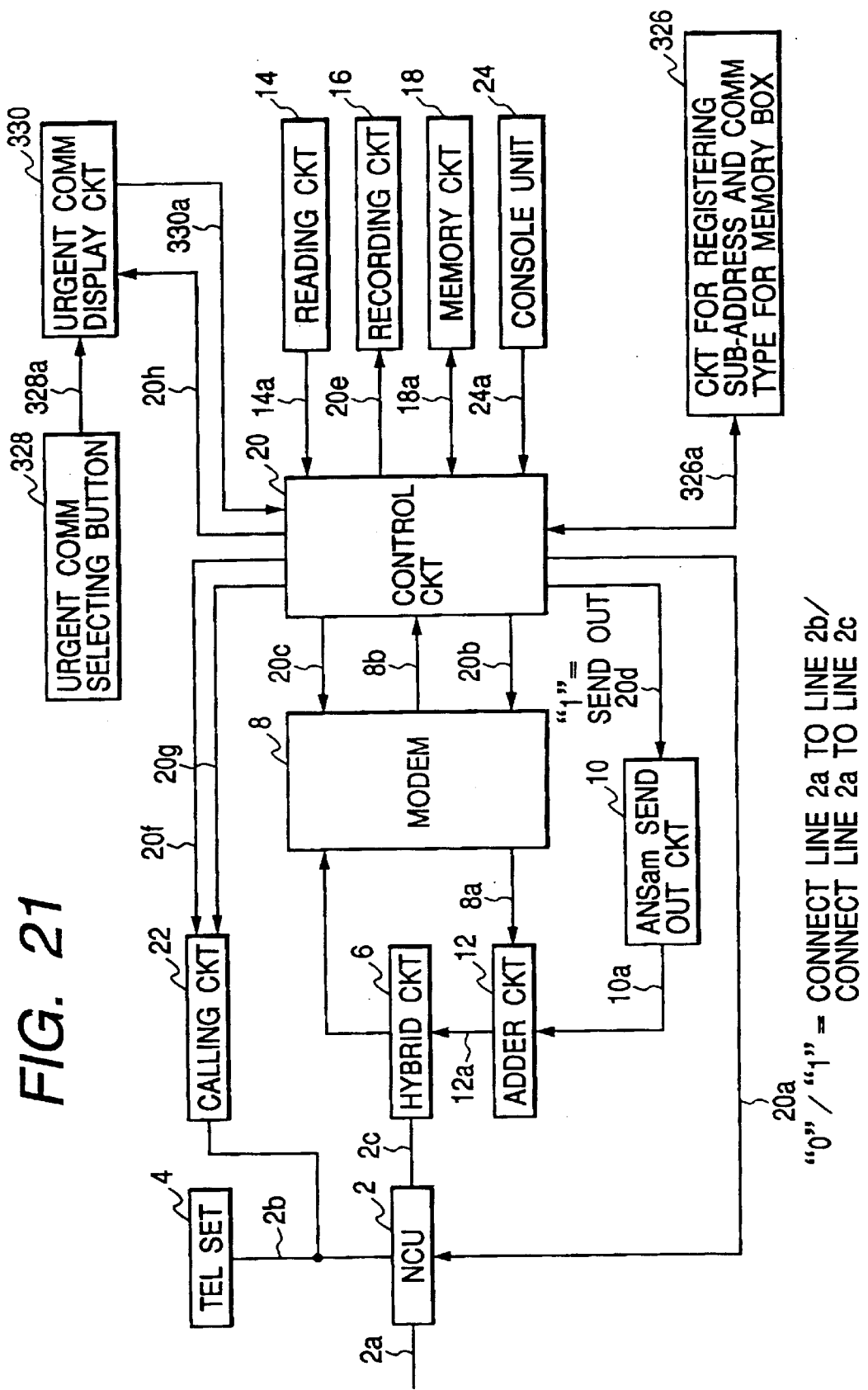
FIG. 21 is a block diagram showing the configuration of a facsimile apparatus employed in Embodiments 6 and 7 of the present invention.

FIG. 21 is a block diagram showing the configuration of a facsimile apparatus according to Embodiments 6 and 7 of the present invention.

In contrast to the configuration shown in FIG. 1, the facsimile apparatus shown in FIG. 21 has a registering circuit 326, a selecting button 328 and a display circuit 330 provided instead of the registering circuits 26 and 28 removed.

The registering circuit 326 is a circuit for registering sub-addresses and communication types corresponding to memory boxes, in which registration is executed via a signal line 326a. The console unit 24 is assumed to be provided with a registering key for the registering circuit 326.

The selecting button 328 is a button for selecting urgent communication and a depression pulse is generated on the signal line 328a when this button 328 is depressed.

The display circuit 330 is a circuit for displaying the selecting of urgent communication. When a clear pulse is generated on the signal line 20h, the display disappears. Subsequently, each time when a depression pulse is generated, a sequence of "to display"→"not to display"→"to display" is repeated. During the display of urgent communication, the display circuit 330 outputs a signal of signal level "1" onto a signal line 330a, and outputs a signal of signal level "0" for onto the signal line 330a during no display of urgent communication.

In Embodiment 6 of the present invention, the control circuit 20 controls the facsimile communication with a sub-address signal added. A calling terminal instructs relay multi-address calling by sending a sub-address signal, while according to the communication type of the memory box corresponding to the received sub-address signal, a facsimile apparatus instructed to execute the relay multi-address calling executes the relay multi-address calling. After the completion of this execution, the communication result is notified to the calling terminal as character data.

The calling terminal having received this communication result is so controlled as to directly call relay multi-address calling failed destination, transmit the same data and output the result of these operations as one communication result.

FIGS. 22 to 27 are flow charts showing the flow of control in the control circuit 20 shown in Embodiment 6 according to the present invention.

Figure 22:
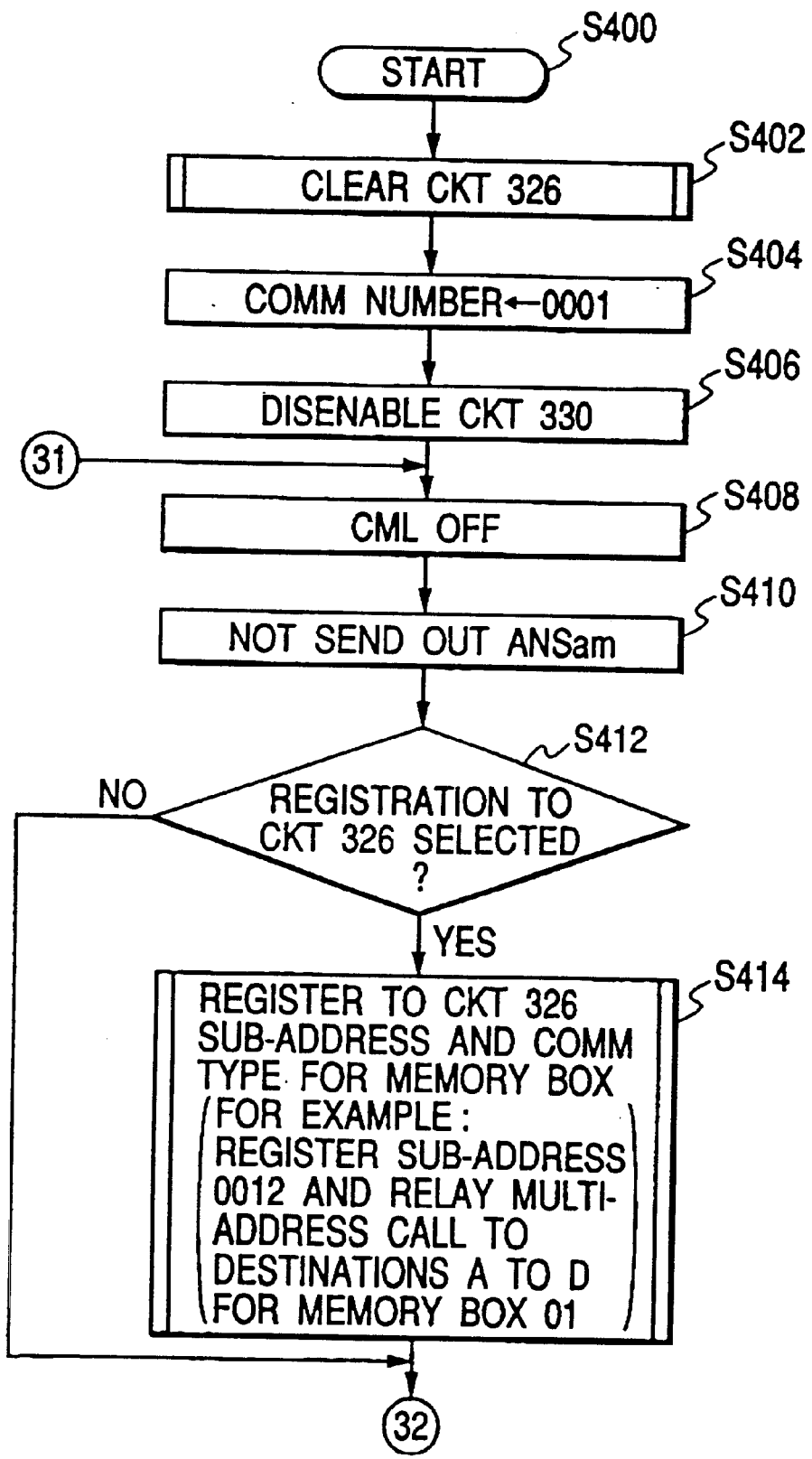
FIG. 22 is a flowchart showing the operation of Embodiment 6.
Figure 23:
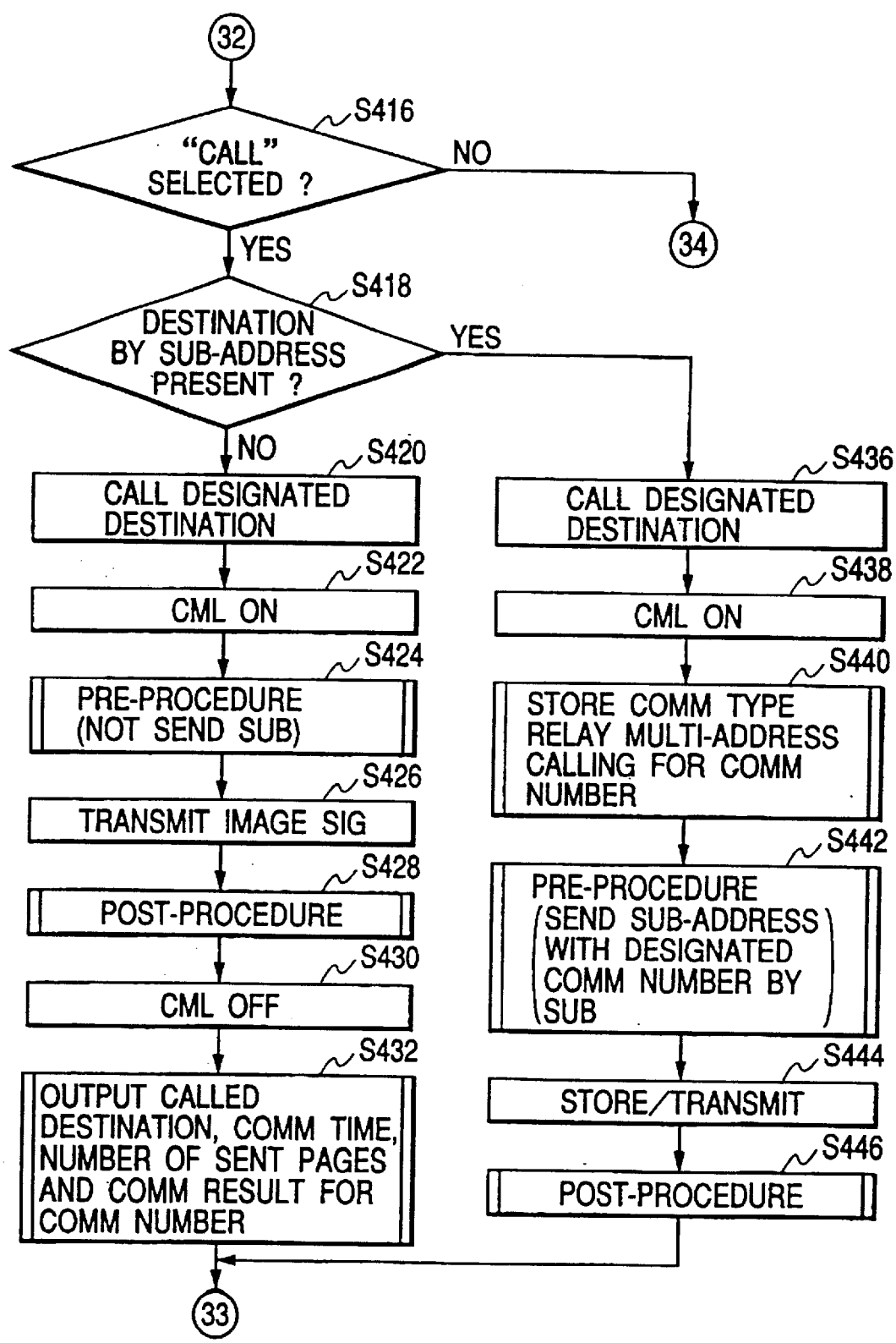
FIG. 23 is a flowchart showing the operation of Embodiment 6.
Figure 24:
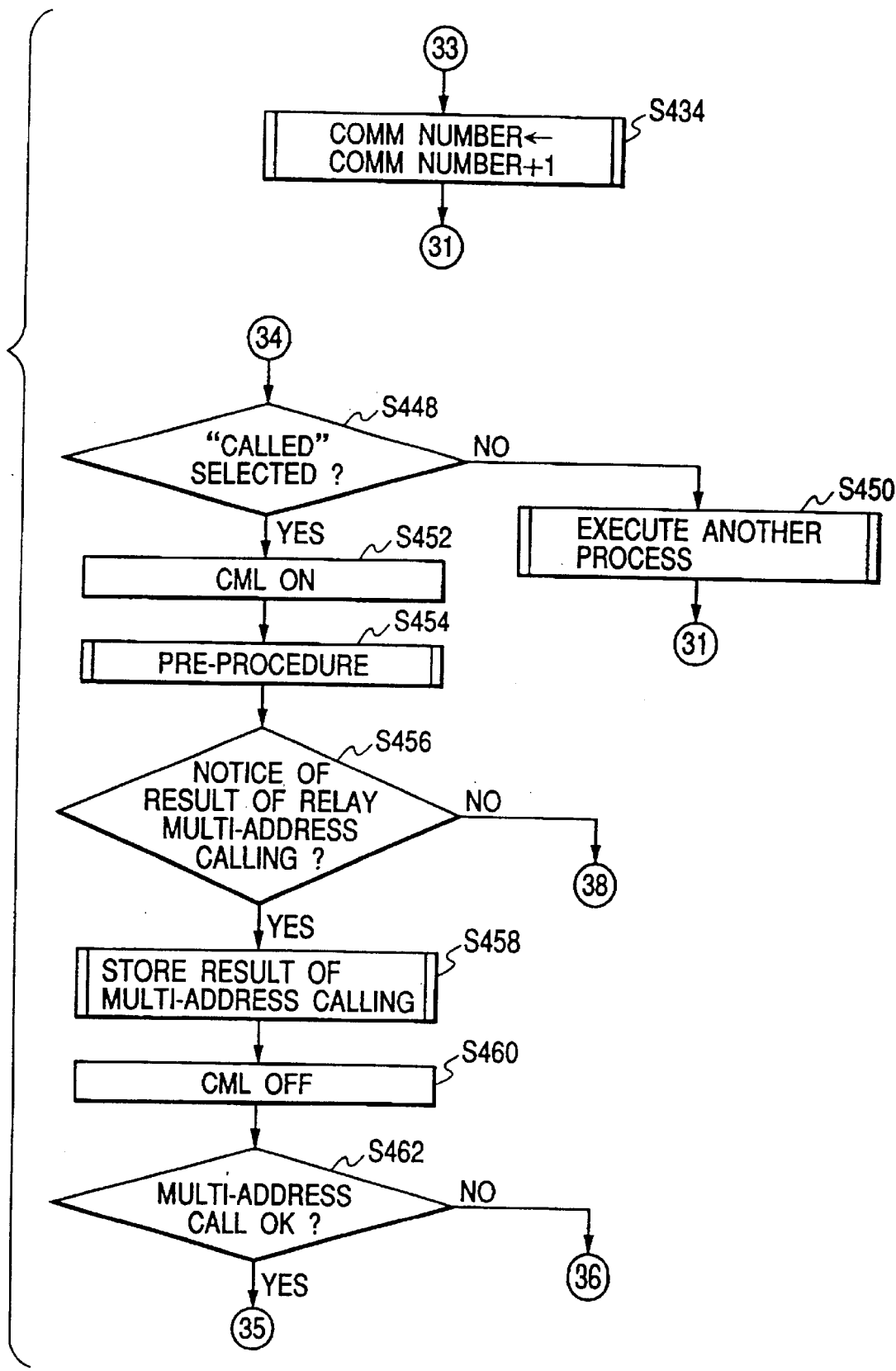
FIG. 24 is a flowchart showing the operation of Embodiment 6.
Figure 25:
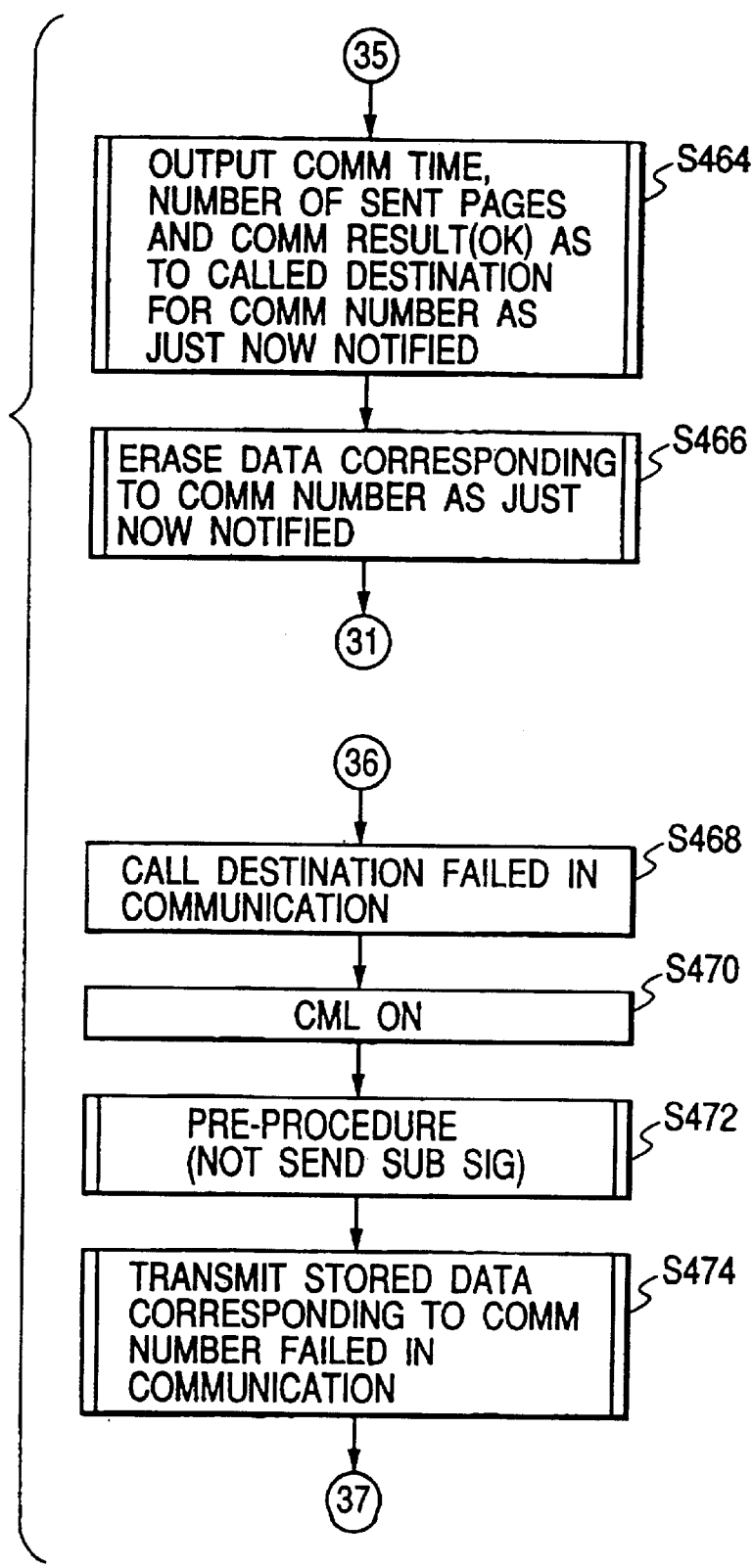
FIG. 25 is a flowchart showing the operation of Embodiment 6.
Figure 26:
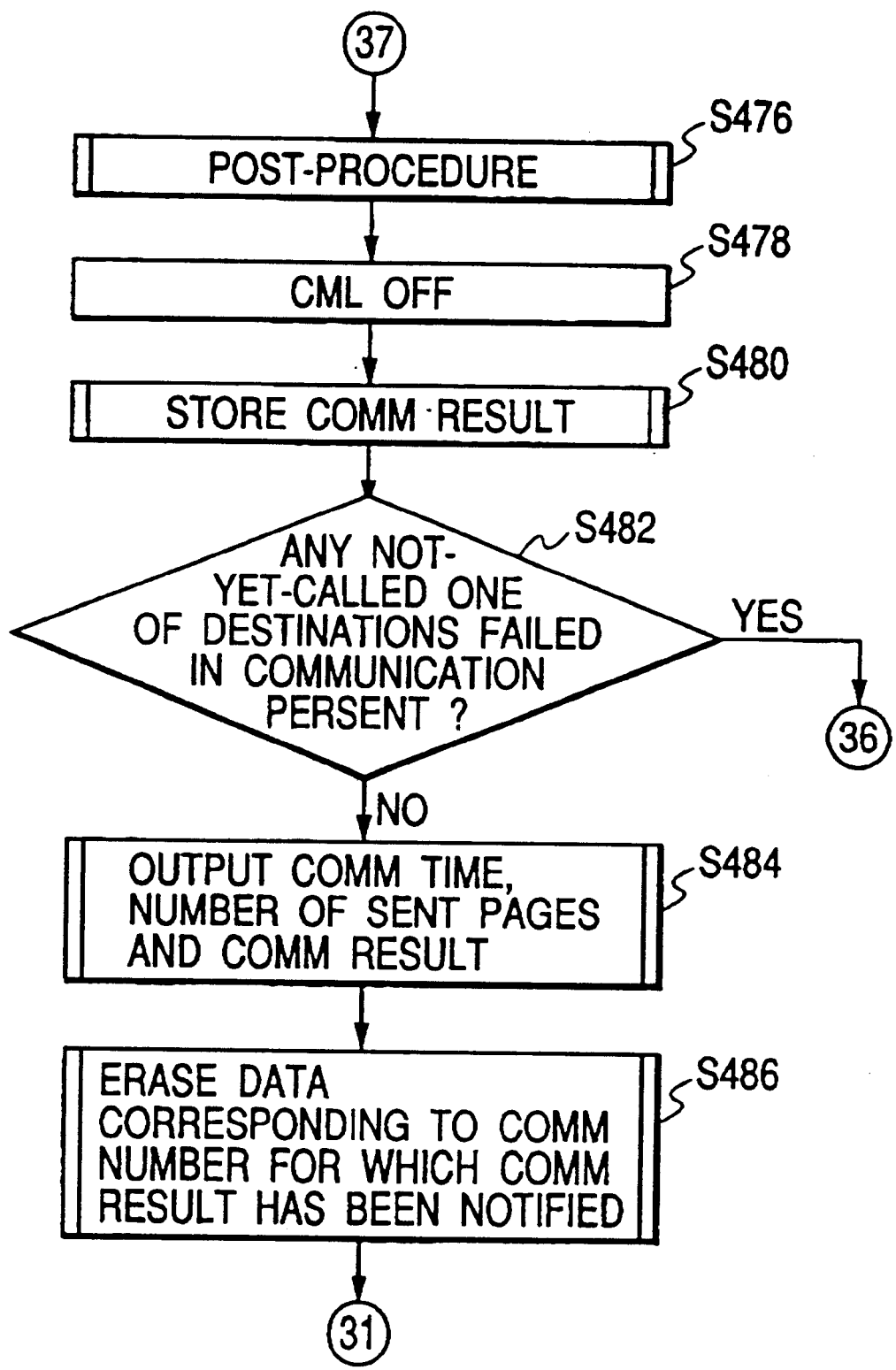
FIG. 26 is a flowchart showing the operation of Embodiment 6.
Figure 27:
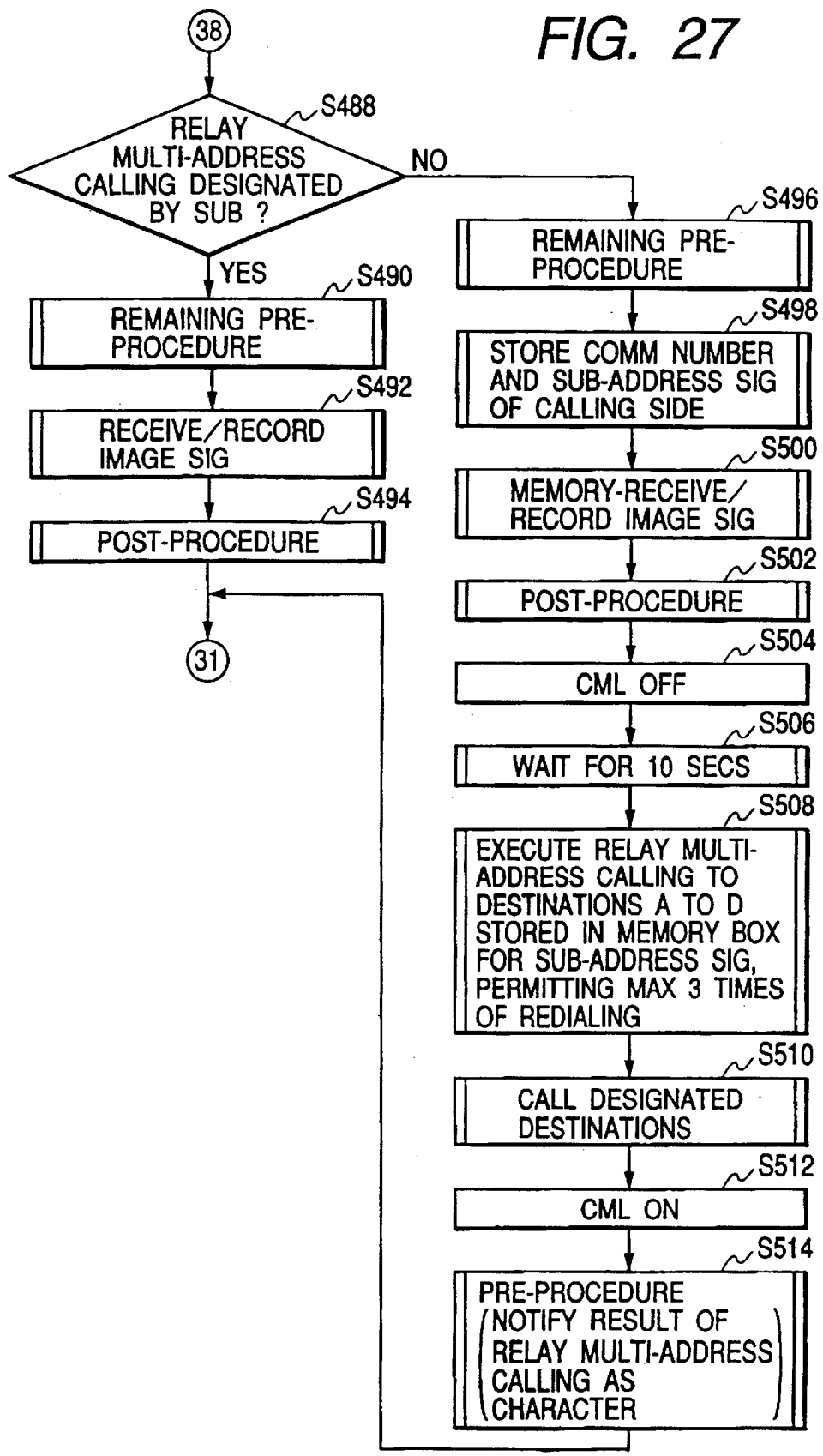
FIG. 27 is a flowchart showing the operation of Embodiment 6.

In FIG. 22, the operation starts at S400 and the data of the registering circuit 326 is cleared via the signal line 326a at S402. At S404, the communication number is set to 0001.

At S406, a clear pulse is generated on the signal line 20h to disenable the urgent communication display circuit 330. At S408, a signal of signal level "0" is output onto the signal line 20a to turn OFF the CML.

At S410, a signal of signal level "0" is output onto the signal line 20d and no ANSam signal is sent. At S412, data of the signal line 24a is input to judge whether the registration into the registering circuit 326 is selected or not. If YES, the control proceeds to S414, and if NOT, to S416.

At S414, sub-addresses and communication types are registered via the signal line 326a into the registering circuit 326 for memory boxes. To the memory 201, for example, a sub-address of 0012 and relay multi-address calling to destinations A, B, C and D are registered.

At S416, the data of the signal line 24a is input to judge whether calling has been selected or not. If YES, the control proceeds to S418, and if NOT, to S448.

At S418, data of the signal line 24a is input to judge whether designation by a sub-address is present or not. If present, the control proceeds to S436, and if NOT, to S420.

At S420, the designated destination is called by the calling circuit 22. At S422, a signal of signal level "1" is output onto the signal line 20a to turn ON the CML. At S424, a pre-procedure is executed and a SUB signal is not sent here.

At S426 and S428, sending of an image signal and a post-procedure are executed in sequence and at S430, a signal of signal level "0" is output onto the signal line 20a to turn OFF the CML.

Thereafter, at S432, called destinations, communication times, numbers of sent pages and communication results are output with respect to the communication number. At S434, the communication number is incremented by one and the control proceeds to S408.

On the other hand, at S436, the designated destination is called by the calling circuit 22. At S438, a signal of signal level "1" is output onto the signal line 20a to turn ON the CML. And at S440, a communication type based on a sub-address, relay multi-address calling, is stored for the communication number.

Then, at S442, a pre-procedure is executed to send the communication number and further the designated the SUB with sub-address signals. Thereafter, at S444 and S446, memory store/sending of an image signal and a post-procedure are executed in sequence. At S434, the communication number is incremented by one and the control proceeds to S408.

At S448, it is judged whether calling has been selected or not and the control proceeds to S452 if calling selected. If not, the control proceeds to S450 to execute another process.

At S452, a signal of signal level "1" is output onto the signal line 20a to turn ON the CML. After execution of a pre-procedure at S454, it is judged whether notification about the result of relay multi-address calling is received or not at S456 and the control proceeds to S488 if negative acknowledge. If affirmative acknowledge, the control proceeds to S458 to store the result of relay multi-address calling and a signal of signal level "0" is output to the signal line 20a at S460 to turn OFF the CML.

At S462, it is judged whether the relay multi-address calling is OK or not and the control proceeds to S464 or S468 respectively if OK or if sending to at least one destination having failed.

At S464, communication time, number of sent pages and communication result (OK) of relay multi-address calling as to * * * called destination for the communication number as just now notified are output. At S466, the communication data for the communication number for as now notified is deleted from the memory. Then, the control proceeds to S408.

On the other hand, at S468, a destination having failed in communication is called by using the calling circuit 22. And, at S470, a signal of signal level "1" is output to the signal line 20a to turn ON the CML. At S472, a pre-procedure is executed and SUB signal is not sent.

Next, at S474, data stored in the memory is transmitted corresponding to the communication number having failed in communication. At S476, a post-procedure is executed and a signal of signal level "1" is output to the signal line 20a at S478 to turn ON the CML. At S480, the communication result is stored.

At S482, it is judged on the notification of relay multi-address calling result whether any not-yet-called one of destinations having failed in communication is present or not. If present, the control proceeds to S468, and if NOT, to S484.

At S484, the communication result or the like is output. For example, "communication time, number of sent pages and communication result of relay multi-address calling (for example, destinations α and β were NG, but they become OK by direct sending from its own station or only the destination α become NG.)" as to the called destination * * * for the communication number as just now notified is output.

At S486, the communication data for communication number notified as a result of relay multi-address calling is deleted from the memory and the control proceeds to S408.

Besides, at S488, it is judged whether any relay multi-address calling designated with a SUB signal is present or not. If present, the control proceeds to S496, and if NOT, to S490.

After the execution of the remaining pre-procedure, receive/recording of an image signal and a post-procedure at S490, S492 and S494, respectively, the control proceeds to S408.

On the other hand, at S496, the remaining post-procedure is executed and at S498, the communication number and sub-address signal of the calling station are stored. At S500 and S502, memory receive/recording of an image signal and a post-procedure are executed respectively. Furthermore, at S504, a signal of signal level "0" is output to the signal line 20a to turn OFF the CML.

Thereafter, after 10 seconds waiting at S506, relay multi-address calling is executed at S508 to destinations A, B, C and D stored in the memory box for sub-address signals. Incidentally, here for each destination, re-dialing is assumed permissible to 3 times at the maximum.

Next, at S510, designated destinations in relay multi-address calling are called using the calling circuit 22. And, at S512, a signal of signal level "1" is output to the signal line 20a to turn ON the CML. At S514, a pre-procedure is executed, where the communication result of relay multi-address calling to the communication number of the designated destinations is notified as a character. Thereafter, the control proceeds to S408.

Next, Embodiment 7 of the present invention will be described.

In Embodiment 7, when urgent communication is set by using the urgent communication selecting button 328 and the display circuit 330, the control circuit 20 executes the same control as with Embodiment 6, whereas when urgent communication is not set, a calling terminal having received a communication result outputs relay multi-address calling failed destinations as a communication result and is controlled not to directly call the failed destinations.

Figure 28:
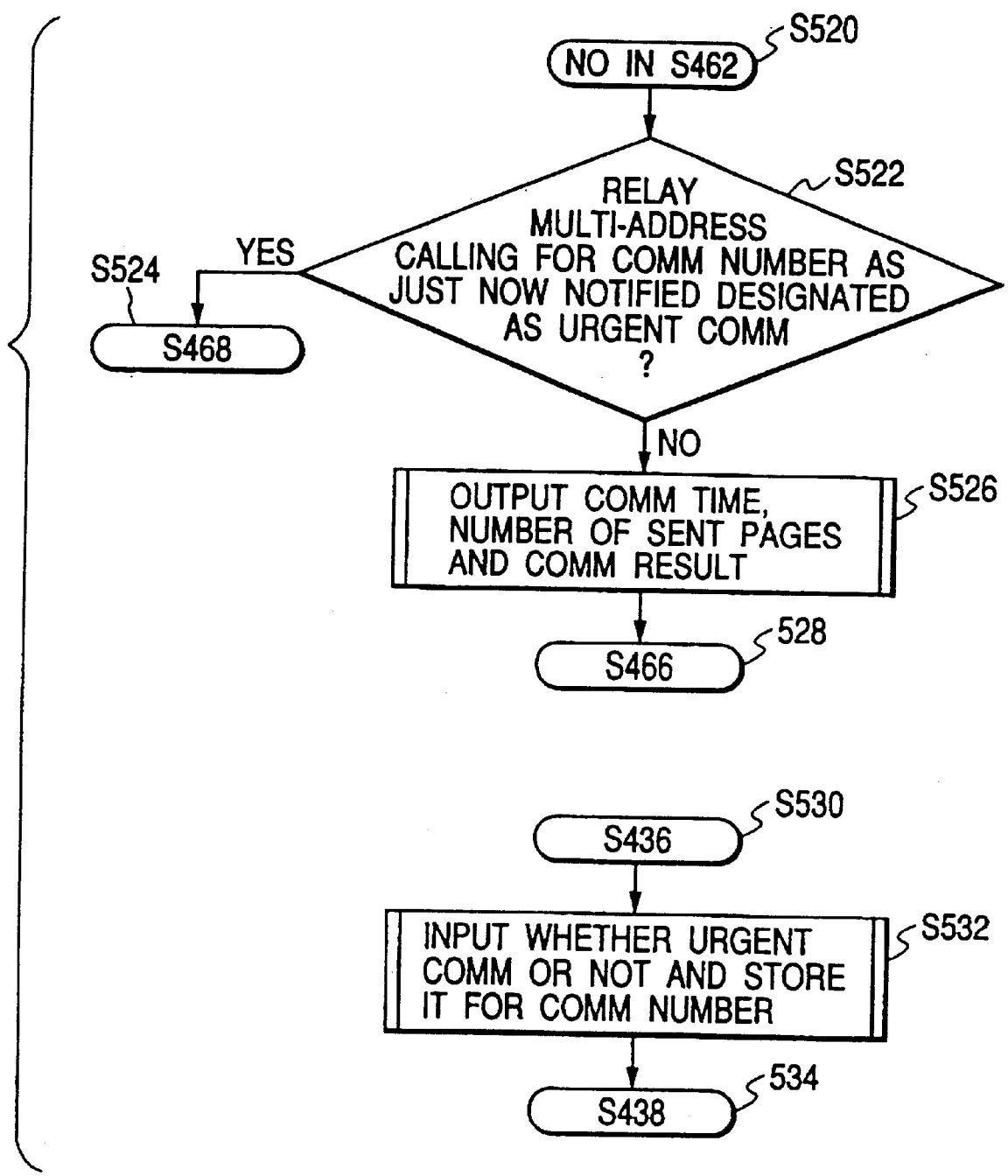
FIG. 28 is a flowchart showing the operation of Embodiment 7.

FIG. 28 is a flow chart showing the portions of operation in Embodiment 7 different from Embodiment 6 (FIGS. 22 to 27).

In FIG. 28, S520 represents negative acknowledge of S462. And, at S522, it is judged whether the relay multi-address calling for the communication number as just now notified is selected as urgent communication or not. If selected, the control proceeds to S524 (S468), and if NOT, to S526.

At S526, communication time, number of sent pages and communication result of relay multi-address calling (e.g., NG to destinations α and β but OK to destination γ) as to the called destination * * * for the communication number as just now notified is output. Thereafter, at S528, the control proceeds to S466.

Besides, S530 represents S436. At S532, data of the signal line 330a is input and whether urgent communication or not is input and stored for a communication number. Thereafter, at S534, the control proceeds to S438.

Incidentally, the operation of the control circuit 20 according to each embodiment as described above has been described to be carried out in accordance with the program stored in the ROM or RAM inside the control circuit 20 by the CPU inside the control circuit 20, but the present invention may be so arranged as to store such a program in external storage media such as flip-flop, hard disk, optical disk, CD-ROM or memory card, read it into the control circuit by means of a dedicated reader and execute it by the CPU inside the control circuit 20.

The above-mentioned embodiments have been described by taking a stand alone type facsimile apparatus as one example. But the present invention is not limited to such facsimile apparatus and is applicable, e.g., to data communication control in a composite data processing system where a copy function, an electronic file function and/or a data processing function are combined with a communication function. Besides, it is applicable similarly to a communication apparatus separated from a reader circuit or a recorder circuit.

As described above, according to the inventions of the present application, since a calling communication apparatus is capable of instructing relay multi-address calling destinations, and directly calling relay multi-address calling impermissible destinations, an extremely easy-to-use communication system can be provided without a great burden on a relay multi-address calling apparatus. Besides, according to the invention, there is an effect of making the communication result record easy to see for an operator.

According to the inventions of the present application, there is an effect of enabling the. forwarding or relay multi-address calling at a higher reception capability than that of its own station by sending an initial identification signal again when a communication type of a memory box corresponding to a sub-address signal sent from a partner station at the receiving time is forwarding or replay multi-address calling. If the forwarding or relay multi-address calling is not designated with the sub-address signal, since the communication is executed at the reception capability of its own station, there can be prevented an increase in communication expense or the like due to communication at a higher resolution than the reception capability of its own station.

According to the invention of the present application, since notification of the reception capability in forwarding or relay multi-address calling of its own station becomes permissible when the forwarding or relay multi-address calling is designated with a sub-address signal, and further this notification declares a high function only for a greater memory capacity available than a reference amount, there is an effect of being able to provide an extremely easy-to-use apparatus without a risk of memory overflow.

Besides, according to the inventions of the present application, since upon forwarding or relay multi-address calling is designated with a sub-address signal notification of reception capability in forwarding or relay multi-address calling of its own station becomes permissible, and further this notification declares a high function only for night of a small traffic, there is an effect of being able to provide an extremely easy-to-use apparatus without a significant increase in failed receive to its own station due to line busy by performing a high function forwarding or a high function relay multi-address calling.

Besides, according to the inventions of the present application, since relay multi-address calling designated with sending of a sub-address signal and can notify failed destinations to a calling communication apparatus by using character data or the like, the calling communication apparatus can effectively use these data and directly calls the failed destinations, thus leading to an increase in the probability of successful relay multi-address calling, so that there is an effect of being able to provide an easy-to-use communication apparatus.

Besides, according to the invention of the present application, since in relay multi-address calling designated with communication number 1234, for example, communication to destinations C and D failed but the communication result of directly calling these destinations C and D to succeed in communication can be output, there is an effect of making the communication result easy to see for a user.

According to the invention of the present application, since the urgency at the time of instructing the relay multi-address calling, an appropriate change in the process of failed communication to a part of relay multi-address calling destinations became permissible, there is an effect of being able to provide a convenient communication apparatus.

What is claimed is:

1. A communication system capable of data communication according to ITU-T Recommendation T.33, comprising:
    a calling communication apparatus including designating means for designating relay multi-address calling destinations with sub-address signals,
    a relay multi-address calling instructed communication apparatus including notifying means for notifying relay multi-address calling impermissible ones of the designated destinations to the calling communication apparatus.

2. The communication system as set forth in claim 1, wherein the relay multi-address calling instructed communication apparatus executes the relay multi-address calling to relay multi-address calling permissible destinations and notifies the communication result to the relay multi-address calling instructing communication apparatus.

3. The communication system as set forth in claim 1, in which the relay multi-address calling instructing communication apparatus directly calls a destination notified to be impermissible for the relay multi-address calling and sends the original data to the destination.

4. The communication system as set forth in claim 1, wherein the relay multi-address calling instructed communication apparatus executes the relay multi-address calling to relay multi-address calling permissible destinations and notifies the communication result to the relay multi-address calling instructing communication apparatus and the relay multi-address calling instructing communication apparatus directly calls a destination notified to be impermissible for the relay multi-address calling and sends original data to the destination.

5. A communication apparatus capable of data communication by using a sub-address signal, comprising registering means for registering sub-addresses and communication types for memory boxes,
    wherein said communication apparatus notifies its possessive reception capability with an initial identification signal at the receiving time and further notifying a higher reception capability than its possessive capability again to a transmitter station with an initial identification signal if a sub-address signal is sent from the transmitter station and the communication type for the sub-address is a specific type and executes normal communication if no sub-address signal is sent, or if a sub-address signal is sent but the communication type for the sub-address signal is not a specific type.

6. The communication apparatus as set forth in claim 5, wherein the specific communication type is forwarding or relay multi-address calling.

7. A communication apparatus capable of data communication by using a sub-address signal, comprising:
    registering means for registering sub-addresses and communication types for memory boxes; and
    detecting means for detecting available memory capacity,
    wherein said communication apparatus re-sends an initial identification signal to notify higher reception capability if the available memory capacity is not less than a reference amount and forwarding or relay multi-address calling is designated with a sub-address signal, and otherwise, a subsequent operation is conducted without re-sending the initial identification signal.

8. The communication apparatus as set forth in claim 7, wherein a first initial identification signal notifies the reception capability of the communication apparatus of its own station and a second initial identification signal of higher reception capability notifies the reception capability permissible for forwarding or relay multi-address calling.

9. A computer readable storage medium storing therein a program for controlling a communication system capable of data communication by using a sub-address signal,
    said program being so controlled that a receiver communication apparatus registers sub-address signals and communication types for memory boxes, a sender communication apparatus instructs relay multi-address calling by sending a sub-address signal and the receiver communication apparatus instructed to execute the relay multi-address calling notifies the communication result to the sender communication apparatus after the completion of executing the communication operation according to the communication type of the memory box corresponding to the received sub-address signal.

10. A communication system capable of data communication by using a sub-address signal, comprising registering means for registering sub-addresses and communication types for memory boxes,
    wherein a receiver communication apparatus comprises registering means for registering sub-address signals and communication types for memory boxes, a sender communication apparatus instructs relay multi-address calling by sending a sub-address signal and the receiver communication apparatus instructed to execute the relay multi-address calling notifies the communication result to the sender communication apparatus after the completion of executing the communication operation according to the communication type of the memory box corresponding to the received sub-address signal.

11. The communication system as set forth in claim 10, wherein said notification is executed by the transmission of character data.

12. The communication system as set forth in claim 10, wherein the sender communication apparatus having received said communication result directly calls the destination failed in relay multi-address calling to execute the sending of the same data.

13. The communication system as set forth in claim 12, wherein the sender communication apparatus having executed the sending of said same data outputs both the communication result from said receiver communication apparatus and the communication result in the case of executing the sending of the same data as one communication result.

14. The communication system as set forth in claim 10, wherein said sender communication apparatus comprises setting means for setting whether urgent or not in the instruction of relay multi-address calling, and wherein the sender communication apparatus having received the notification of said communication result directly calls a relay multi-address calling failed destination to execute the sending of the same data in the case of urgent setting and outputs the relay multi-address calling failed destination as a communication result without direct calling to the relay multi-address calling failed destination in the case of not urgent setting.

15. A control method of a communication system capable of data communication according to ITU-T Recommendation T.33, wherein a calling communication apparatus designates relay multi-address calling destinations with sub-address signals and a relay multi-address calling instructed communication apparatus notifies to the calling communication apparatus relay multi-address calling impermissible ones of the relay multi-address calling designated destinations.

16. A control method of a communication apparatus capable of data communication by using a sub-address signal, comprising the steps of:
  registering sub-addresses and communication types for memory boxes;
  notifying to a transmitter station its possessive reception capability with an initial identification signal at the receiving time; and
  notifying a higher reception capability than its possessive capability again to the transmitter station with an initial identification signal if the sub-address signal is sent from the transmitter station and the communication type for the sub-address is a specific type, or executing the normal communication if no sub-address signal is sent or if the sub-address signal is sent but the communication type for the sub-address signal is not a specific type.

17. A control method of a communication apparatus capable of data communication by using a sub-address signal, comprising the steps of:
  registering sub-addresses and communication types for memory boxes and detecting the available memory capacity; and
  re-sending higher reception capability with an initial identification signal if the available memory capacity is not less than a reference amount and forwarding or relay multi-address calling is designated by a sub-address signal, or otherwise moving to a subsequent operation without re-sending an initial identification signal.

18. A control method of a communication apparatus capable of data communication by using a sub-address signal, comprising the steps of:
  registering sub-addresses and communication types for memory boxes and registering time A and time B; and
  re-sending higher reception capability with an initial identification signal if the current time lies between the times A and B and forwarding or relay multi-address calling is designated with a sub-address signal, or otherwise moving to a subsequent operation without re-sending an initial identification signal.

19. A control method of a communication system capable of data communication by using a sub-address signal, wherein a receiver communication apparatus registers sub-address signals and communication types for memory boxes, a sender communication apparatus instructs relay multi-address calling by sending a sub-address signal and the receiver communication apparatus instructed to execute the relay multi-address calling notifies the communication result to the sender communication apparatus after the completion of executing the communication operation according to the communication type of the memory box corresponding to the received sub-address signal.

20. A computer readable storage medium storing therein a program for controlling a communication system capable of data communication according to ITU-T Recommendation T.33, wherein a calling communication apparatus designates relay multi-address calling destinations with sub-address signals and a relay multi-address calling instructed communication apparatus notifies to the calling communication apparatus relay multi-address calling impermissible ones of the designated destinations.

21. A computer readable storage medium storing therein a program for controlling a communication apparatus capable of data communication by using a sub-address signal,
  wherein said program being so stored as to register sub-addresses and communication types for memory boxes; to notify its possessive reception capability with an initial identification signal at the receiving time; and to notify a higher reception capability than its possessive capability again to a transmitter station with an initial identification signal if a sub-address signal is sent from the transmitter station and the communication type for the sub-address is a specific type, or to execute the normal communication if no sub-address signal is sent or if the sub-address signal is sent but the communication type for the sub-address signal is not a specific type.

22. A computer readable storage medium storing therein a program for controlling a communication apparatus capable of data communication by using a sub-address signal,
  said program being so controlled as to register sub-addresses and communication types for memory boxes and detect the available memory capacity; and
  to re-send higher reception capability with an initial identification signal if the available memory capacity is not less than a reference amount and forwarding or relay multi-address calling is designated with a sub-address signal, or otherwise to move to a subsequent operation without re-sending an initial identification signal.

23. A computer readable storage medium storing therein a program for controlling a communication apparatus capable of data communication by using a sub-address signal,
  said program being so controlled as to register sub-addresses and communication types for memory boxes and to register time A and time B; and to re-send higher reception capability with an initial identification signal if the current time lies between the times A and B and forwarding or relay multi-address calling is designated with a sub-address signal, or otherwise to move to a subsequent operation without re-sending an initial identification signal.

24. A communication apparatus capable of data communication by using a sub-address signal, comprising registering means for registering sub-addresses and communication types for memory boxes and time registering means for registering a time A and a time B, wherein said communication apparatus re-sends an initial identification signal to notify higher reception capability, if it is between the times A and B and forwarding or relay multi-address calling is designated with a sub-address signal, and otherwise, a subsequent operation is conducted without re-sending the initial identification signal.

25. The communication apparatus according to claim 24, wherein a first initial identification signal notifies the reception capability of the communication apparatus of its own station and a second initial identification signal of high reception capability notifies the reception capability permissible for forwarding or relay multi-address calling.

* * * * *

UNITED STATES PATENT AND TRADEMARK OFFICE
CERTIFICATE OF CORRECTION

PATENT NO.     : 6,507,414 B1
DATED          : January 14, 2003
INVENTOR(S)    : Takehiro Yoshida It is certified that error appears in the above-identified patent and that said Letters Patent is hereby corrected as shown below:

<u>Title page,</u>
Item [57], ABSTRACT,
Line 1, "executing" should read -- execute --.

<u>Column 4,</u>
Lines 25 and 52, "proceeding" should read -- proceeds --.

<u>Column 5,</u>
Line 23, "proceeding" should read -- proceeds --.

<u>Column 11,</u>
Line 8, "loses" should read -- lose --.
Line 10, "terminated with failure" should read -- be erroneously terminated --.
Line 39, "for" should be deleted.

<u>Column 14,</u>
Line 48, "the." should read -- the --.

Signed and Sealed this

Eighteenth Day of November, 2003

JAMES E. ROGAN
*Director of the United States Patent and Trademark Office*